United States Patent
Ozturk et al.

(10) Patent No.: US 11,448,728 B2
(45) Date of Patent: Sep. 20, 2022

(54) METHOD, APPARATUS, AND SYSTEM FOR SOUND SENSING BASED ON WIRELESS SIGNALS

(71) Applicants: Muhammed Zahid Ozturk, Beltsville, MD (US); Chenshu Wu, Hong Kong (CN); Beibei Wang, Clarksville, MD (US); K. J. Ray Liu, Potomac, MD (US); Oscar Chi-Lim Au, San Jose, CA (US)

(72) Inventors: Muhammed Zahid Ozturk, Beltsville, MD (US); Chenshu Wu, Hong Kong (CN); Beibei Wang, Clarksville, MD (US); K. J. Ray Liu, Potomac, MD (US); Oscar Chi-Lim Au, San Jose, CA (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 17/492,598

(22) Filed: Oct. 2, 2021

(65) Prior Publication Data

US 2022/0026531 A1 Jan. 27, 2022

Related U.S. Application Data

(63) Continuation-in-part of application No. 15/326,112, filed as application No. PCT/US2015/041037 on Jul.
(Continued)

(51) Int. Cl.
*G01S 7/41* (2006.01)
*G01S 7/288* (2006.01)
(Continued)

(52) U.S. Cl.
CPC ............ *G01S 7/417* (2013.01); *G01S 7/2883* (2021.05); *G01S 13/003* (2013.01); *G01S 13/34* (2013.01);
(Continued)

(58) Field of Classification Search
CPC combination set(s) only.
See application file for complete search history.

(56) References Cited

U.S. PATENT DOCUMENTS

2021/0018610 A1* 1/2021 Babakhani ................ G01S 7/28

FOREIGN PATENT DOCUMENTS

| CN | 112254802 | * | 1/2021 | ............ G01H 11/06 |
| WO | WO2021087337 | * | 5/2021 | ............ G01S 13/50 |

OTHER PUBLICATIONS

Wang et al., "UWHear: Through-wall Extraction and Separation of Audio Vibrations Using Wireless Signals", Nov. 2020, SenSys'20, pp. 1-14 (Year: 2020).*
(Continued)

*Primary Examiner* — Zhiyu Lu

(57) ABSTRACT

Methods, apparatus and systems for sound sensing based on radio signals are described. In one example, a described system comprises: a transmitter configured to transmit a first wireless signal through a wireless channel of a venue; a receiver configured to receive a second wireless signal through the wireless channel, wherein the second wireless signal comprises a reflection of the first wireless signal by at least one object in the venue; and a processor. The processor is configured for: obtaining a time series of channel information (CI) of the wireless channel based on the second wireless signal, determining a presence of a vibrating object in the venue based on the time series of CI (TSCI), extracting a sound signal from the TSCI, and reconstructing at least one speech based on the sound signal.

30 Claims, 11 Drawing Sheets

Related U.S. Application Data 17, 2015, application No. 17/492,598, which is a continuation-in-part of application No. 16/127,151, filed on Sep. 10, 2018, now Pat. No. 11,012,285, which is a continuation-in-part of application No. PCT/US2017/021963, filed on Mar. 10, 2017, application No. 17/942,598, which is a continuation-in-part of application No. 16/667,757, filed on Oct. 29, 2019, now abandoned, and a continuation-in-part of application No. 16/790,610, filed on Feb. 13, 2020, and a continuation-in-part of application No. 16/790,627, filed on Feb. 13, 2020, and a continuation-in-part of application No. 16/798,343, filed on Feb. 22, 2020, and a continuation-in-part of application No. 16/871,000, filed on May 10, 2020, and a continuation-in-part of application No. 16/871,004, filed on May 10, 2020, and a continuation-in-part of application No. 16/871,006, filed on May 10, 2020, and a continuation-in-part of application No. 16/909,913, filed on Jun. 23, 2020, and a continuation-in-part of application No. 16/909,940, filed on Jun. 23, 2020, and a continuation-in-part of application No. 16/945,827, filed on Aug. 1, 2020, and a continuation-in-part of application No. 16/945,837, filed on Aug. 1, 2020, and a continuation-in-part of application No. 17/019,273, filed on Sep. 13, 2020, now abandoned, and a continuation-in-part of application No. 17/019,271, filed on Sep. 13, 2020, now abandoned, and a continuation-in-part of application No. 17/019,270, filed on Sep. 13, 2020, and a continuation-in-part of application No. 17/113,024, filed on Dec. 5, 2020, now Pat. No. 11,202,215, and a continuation-in-part of application No. 17/113,023, filed on Dec. 5, 2020, and a continuation-in-part of application No. 17/149,625, filed on Jan. 14, 2021, and a continuation-in-part of application No. 17/149,667, filed on Jan. 14, 2021, and a continuation-in-part of application No. 17/180,763, filed on Feb. 20, 2021, which is a continuation-in-part of application No. 16/798,343, filed on Feb. 22, 2020, which is a continuation-in-part of application No. 16/798,337, filed on Feb. 22, 2020, now Pat. No. 10,845,463, application No. 17/492,598, which is a continuation-in-part of application No. 17/180,762, filed on Feb. 20, 2021, and a continuation-in-part of application No. 17/180,760, filed on Feb. 20, 2021, now Pat. No. 11,181,486, and a continuation-in-part of application No. 17/180,766, filed on Feb. 20, 2021, and a continuation-in-part of application No. 17/214,838, filed on Mar. 27, 2021, and a continuation-in-part of application No. 17/214,836, filed on Mar. 27, 2021, and a continuation-in-part of application No. 17/352,185, filed on Jun. 18, 2021, and a continuation-in-part of application No. 17/352,306, filed on Jun. 20, 2021.

(60) Provisional application No. 63/087,122, filed on Oct. 2, 2020, provisional application No. 63/112,563, filed on Nov. 11, 2020, provisional application No. 63/209,907, filed on Jun. 11, 2021.

(51) Int. Cl.
*H04W 4/021* (2018.01)
*G01S 13/00* (2006.01)
*G01S 13/34* (2006.01)
*G01S 13/46* (2006.01)

(52) U.S. Cl.
CPC ............. *G01S 13/46* (2013.01); *H04W 4/021* (2013.01); *G01S 2013/462* (2013.01)

(56) References Cited

OTHER PUBLICATIONS

Wei et al., "Acoustic Eavesdropping through Wireless Vibrometry", Sep. 2015, MobiCom'15, pp. 130-141 (Year: 2015).*
Jiang et al., "mmVib: Micrometer-Level Vibration Measurement with mmWave Radar", Sep. 2020, MobiCom'20 (Year: 2020).*
Wang, "Towards Robust and Secure Audio Sensing Using Wireless Vibrometry and Deep Learning", 2020, UCLA Electronic Theses and Dissertations (Year: 2020).*

* cited by examiner

METHOD, APPARATUS, AND SYSTEM FOR SOUND SENSING BASED ON WIRELESS SIGNALS

CROSS-REFERENCE TO RELATED APPLICATIONS

The present application is related to U.S. patent application, entitled "METHOD, APPARATUS, AND SYSTEM FOR HUMAN RECOGNITION BASED ON GAIT FEATURES," filed on Oct. 2, 2021, which is expressly incorporated by reference herein in its entirety.

The present application hereby incorporates by reference the entirety of the disclosures of, and claims priority to, each of the following cases:

(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/667,757, entitled "METHOD, APPARATUS, AND SYSTEM FOR HUMAN IDENTIFICATION BASED ON HUMAN RADIO BIOMETRIC INFORMATION", filed on Oct. 29, 2019,
(d) U.S. patent application Ser. No. 16/790,610, entitled "METHOD, APPARATUS, AND SYSTEM FOR WIRELESS GAIT RECOGNITION", filed Feb. 13, 2020,
(e) U.S. patent application Ser. No. 16/790,627, entitled "METHOD, APPARATUS, AND SYSTEM FOR OUTDOOR TARGET TRACKING", filed Feb. 13, 2020.
(f) U.S. patent application Ser. No. 16/798,343, entitled "METHOD, APPARATUS, AND SYSTEM FOR WIRELESS OBJECT TRACKING", filed Feb. 22, 2020,
(g) U.S. patent application Ser. No. 16/871,000, entitled "METHOD, APPARATUS, AND SYSTEM FOR WIRELESS TRACKING WITH GRAPH-BASED PARTICLE FILTERING", filed on May 10, 2020,
(h) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020,
(i) U.S. patent application Ser. No. 16/871,006, entitled "METHOD, APPARATUS, AND SYSTEM FOR VITAL SIGNS MONITORING USING HIGH FREQUENCY WIRELESS SIGNALS", filed on May 10, 2020,
(j) U.S. patent application Ser. No. 16/909,913, entitled "METHOD, APPARATUS, AND SYSTEM FOR IMPROVING TOPOLOGY OF WIRELESS SENSING SYSTEMS", filed on Jun. 23, 2020,
(k) U.S. patent application Ser. No. 16/909,940, entitled "METHOD, APPARATUS, AND SYSTEM FOR QUALIFIED WIRELESS SENSING", filed on Jun. 23, 2020,
(l) U.S. patent application Ser. No. 16/945,827, entitled "METHOD, APPARATUS, AND SYSTEM FOR PROCESSING AND PRESENTING LIFE LOG BASED ON A WIRELESS SIGNAL", filed on Aug. 1, 2020,
(m) U.S. patent application Ser. No. 16/945,837, entitled "METHOD, APPARATUS, AND SYSTEM FOR WIRELESS SLEEP MONITORING", filed on Aug. 1, 2020,
(n) U.S. patent application Ser. No. 17/019,273, entitled "METHOD, APPARATUS, AND SYSTEM FOR AUTOMATIC AND ADAPTIVE WIRELESS MONITORING AND TRACKING", filed on Sep. 13, 2020,
(o) U.S. patent application Ser. No. 17/019,271, entitled "METHOD, APPARATUS, AND SYSTEM FOR POSITIONING AND POWERING A WIRELESS MONITORING SYSTEM", filed on Sep. 13, 2020,
(p) U.S. patent application Ser. No. 17/019,270, entitled "METHOD, APPARATUS, AND SYSTEM FOR VEHICLE WIRELESS MONITORING", filed on Sep. 13, 2020,
(q) U.S. Provisional Patent application 63/087,122, entitled "METHOD, APPARATUS, AND SYSTEM FOR WIRELESS TRACKING", filed on Oct. 2, 2020,
(r) U.S. Provisional Patent application 63/090,670, entitled "METHOD, APPARATUS, AND SYSTEM FOR WIRELESS MONITORING TO ENSURE SECURITY", filed on Oct. 12, 2020,
(s) U.S. Provisional Patent application 63/104,422, entitled "METHOD, APPARATUS, AND SYSTEM FOR WIRELESS MONITORING", filed on Oct. 22, 2020,
(t) U.S. Provisional Patent application 63/112,563, entitled "METHOD, APPARATUS, AND SYSTEM FOR WIRELESS MONITORING BASED ON ANTENNA ARRANGEMENT", filed on Nov. 11, 2020,
(u) U.S. patent application Ser. No. 17/113,024, entitled "METHOD, APPARATUS, AND SYSTEM FOR PROVIDING AUTOMATIC ASSISTANCE BASED ON WIRELESS MONITORING", filed on Dec. 5, 2020,
(v) U.S. patent application Ser. No. 17/113,023, entitled "METHOD, APPARATUS, AND SYSTEM FOR ACCURATE WIRELESS MONITORING", filed on Dec. 5, 2020,
(w) U.S. patent application Ser. No. 17/149,625, entitled "METHOD, APPARATUS, AND SYSTEM FOR WIRELESS MONITORING WITH MOTION LOCALIZATION", filed on Jan. 14, 2021,
(x) U.S. patent application Ser. No. 17/149,667, entitled "METHOD, APPARATUS, AND SYSTEM FOR WIRELESS MONITORING WITH FLEXIBLE POWER SUPPLY", filed on Jan. 14, 2021,
(y) U.S. patent application Ser. No. 17/180,763, entitled "METHOD, APPARATUS, AND SYSTEM FOR WIRELESS WRITING TRACKING", filed on Feb. 20, 2021,
  (1) which is a Continuation-in-Part of U.S. patent application Ser. No. 16/798,343, entitled "METHOD, APPARATUS, AND SYSTEM FOR WIRELESS OBJECT TRACKING", filed on Feb. 22, 2020,
   a. which is a Continuation-in-Part of U.S. patent application Ser. No. 16/798,337, entitled "METHOD, APPARATUS, AND SYSTEM FOR WIRELESS OBJECT SCANNING", filed Feb. 22, 2020, issued as U.S. Pat. No. 10,845,463 on Nov. 24, 2020,
(z) U.S. patent application Ser. No. 17/180,762, entitled "METHOD, APPARATUS, AND SYSTEM FOR FALL-DOWN DETECTION BASED ON A WIRELESS SIGNAL", filed on Feb. 20, 2021,
(aa) U.S. patent application Ser. No. 17/180,760, entitled "METHOD, APPARATUS, AND SYSTEM FOR WIRELESS MATERIAL SENSING", filed on Feb. 20, 2021,
(bb) U.S. patent application Ser. No. 17/180,766, entitled "METHOD, APPARATUS, AND SYSTEM FOR WIRELESS MOTION RECOGNITION", filed on Feb. 20, 2021,
(cc) U.S. patent application Ser. No. 17/214,838, entitled "METHOD, APPARATUS, AND SYSTEM FOR WIRELESS VITAL MONITORING USING HIGH FREQUENCY SIGNALS", filed on Mar. 27, 2021,
(dd) U.S. patent application Ser. No. 17/214,841, entitled "METHOD, APPARATUS, AND SYSTEM FOR WIRELESS PROXIMITY SENSING", filed on Mar. 27, 2021,
(ee) U.S. patent application Ser. No. 17/214,836, entitled "METHOD, APPARATUS, AND SYSTEM FOR WIRELESSLY TRACKING KEYSTROKES", filed on Mar. 27, 2021,
(ff) U.S. Provisional Patent application 63/209,907, entitled "METHOD, APPARATUS, AND SYSTEM FOR WIRELESS MOTION AND SOUND SENSING", filed on Jun. 11, 2021,
(gg) U.S. patent application Ser. No. 17/352,185, entitled "METHOD, APPARATUS, AND SYSTEM FOR WIRELESS MICRO MOTION MONITORING", filed on Jun. 18, 2021,
(hh) U.S. patent application Ser. No. 17/352,306, entitled "METHOD, APPARATUS, AND SYSTEM FOR WIRELESS MONITORING TO ENSURE SECURITY", filed on Jun. 20, 2021.

TECHNICAL FIELD

The present teaching generally relates to sound sensing. More specifically, the present teaching relates to sound sensing based on radio signals by processing wireless channel information (CI).

BACKGROUND

Sound sensing, as the most natural way of human communication, has also become a ubiquitous modality for human-machine-environment interactions. Many applications have emerged in the Internet of Things (IoT), including voice interfaces, sound events monitoring in smart homes and buildings, acoustic sensing for gestures and health, etc. For example, smart speakers can now understand user voices, control IoT devices, monitor the environment, and sense sounds of interest such as glass breaking or smoke detectors, all currently using microphones as the primary interface.

Although microphones have been the most commonly used sensors to sense acoustics events, they have certain limitations. As they can only sense the sound at the destination (i.e., the microphone's location), a single microphone cannot separate and identify multiple sound sources, whereas a microphone array can only separate in the azimuth direction and require large apertures. By sensing any sound arrived at the destination, microphones raise potential privacy concerns when deploying them as ubiquitous and continuous sound sensing interfaces in homes. In addition, microphones are prone to inaudible voice attacks and replay attacks, as they only sense the received sound but nothing about the source.

To overcome some of these limitations, various modalities have been exploited to sense sound signals, like accelerometer, vibration motor, cameras, etc. These systems either still sense the sound at the destination, thus having similar drawbacks as microphones, or require line-of-sight (LOS) and lighting conditions to operate. Consequently, these modalities are not entirely satisfactory.

SUMMARY

The present teaching generally relates to sound sensing. More specifically, the present teaching relates to sound sensing based on radio signals by processing wireless channel information (CI).

In one embodiment, a system for sound sensing is described. The system comprises: a transmitter configured to transmit a first wireless signal through a wireless channel of a venue; a receiver configured to receive a second wireless signal through the wireless channel, wherein the second wireless signal comprises a reflection of the first wireless signal by at least one object in the venue; and a processor. The processor is configured for: obtaining a time series of channel information (CI) of the wireless channel based on the second wireless signal, determining a presence of a vibrating object in the venue based on the time series of CI (TSCI), extracting a sound signal from the TSCI, and reconstructing at least one speech based on the sound signal.

In another embodiment, a wireless device of a sound sensing system is described. The wireless device comprises: a processor; a memory communicatively coupled to the processor; and a receiver communicatively coupled to the processor. An additional wireless device of the sound sensing system is configured to transmit a first wireless signal through a wireless channel of a venue. The receiver is configured to receive a second wireless signal through the wireless channel. The second wireless signal comprises a reflection of the first wireless signal by at least one object in the venue. The processor is configured for: obtaining a time series of channel information (CI) of the wireless channel based on the second wireless signal, determining a presence of a vibrating object in the venue based on the time series of CI (TSCI), extracting a sound signal from the TSCI, and reconstructing at least one speech based on the sound signal.

In yet another embodiment, a method of a sound sensing system is described. The method comprises: transmitting a first wireless signal through a wireless channel of a venue; receiving a second wireless signal through the wireless channel, wherein the second wireless signal comprises a reflection of the first wireless signal by at least one object in the venue; obtaining a time series of channel information (CI) of the wireless channel based on the second wireless signal; determining a presence of a vibrating object in the venue based on the time series of CI (TSCI); extracting a sound signal from the TSCI, and reconstructing at least one speech based on the sound signal.

Other concepts relate to software for implementing the present teaching on sound sensing. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
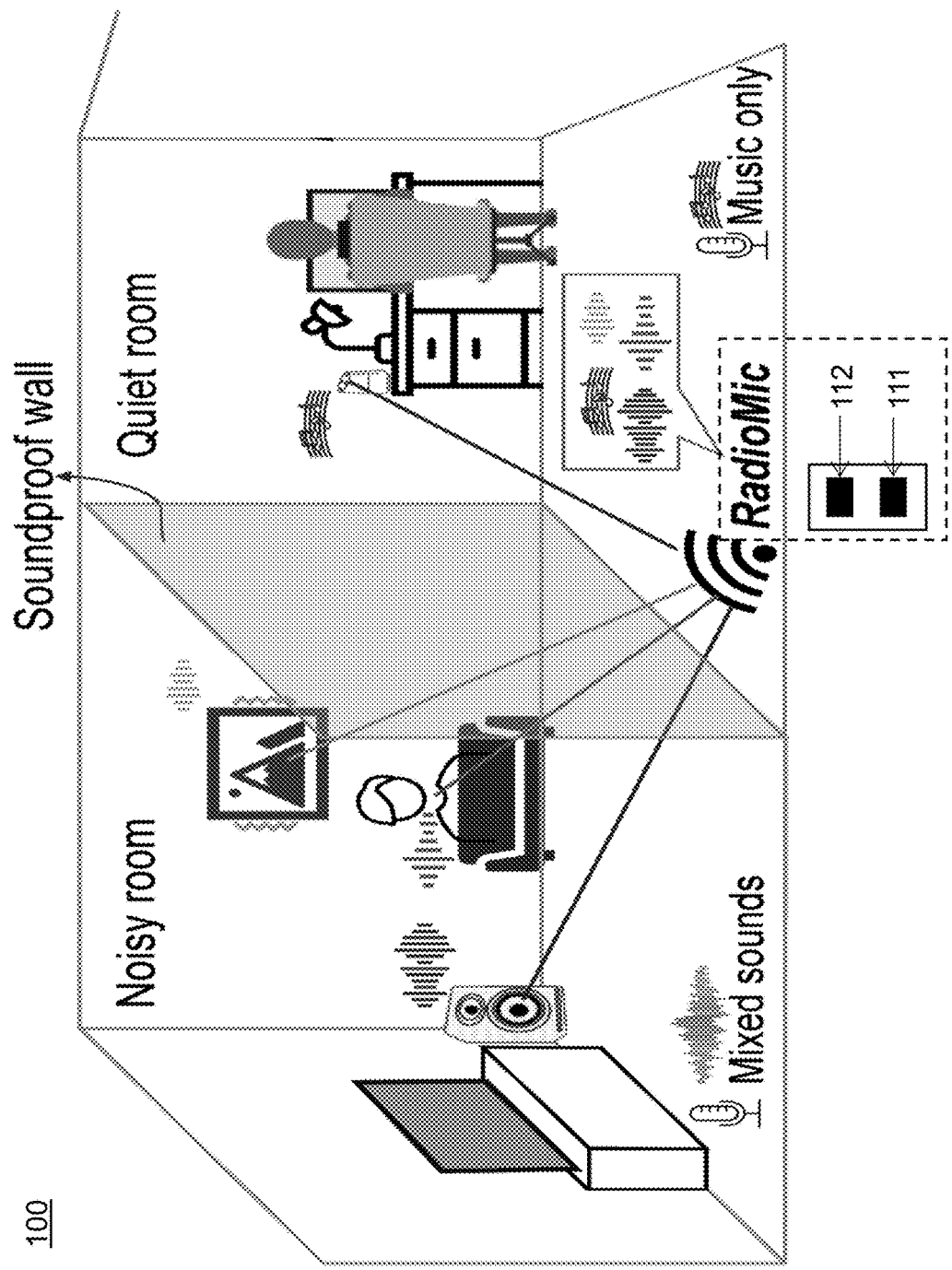
FIG. 1 illustrates an exemplary implementation environment for a sound sensing system using millimeter wave (mmWave) radio, according to some embodiments of the present disclosure.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beacon/pilot/probe/enquiry/acknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g.

wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID. The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI.

The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a retraining, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated.

There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object.

The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals.

For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address.

A location of a Type 2 device in the venue may be computed based on the particular MAC address, the series of probe signals, and/or the at least one TSCI obtained by the Type 2 device from the probe signals. The computing may be performed by the Type 2 device.

The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time.

The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device.

Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device.

The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver).

Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source.

If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01s for 100 Hz), but each probe signal may experience small time perturbation, perhaps due to timing requirement, timing control, network control, handshaking, message passing, collision avoidance, carrier sensing, congestion, availability of resources, and/or another consideration.

The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually.

The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc.

The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/ may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.).

For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event.

At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/ locations/movements/activities. Labels/tags may be generated for the clusters. The clusters may be stored and retrieved. The classifier may be applied to associate the current TSCI (or characteristics/STI or the other analytics/ output response, perhaps associated with a current event) with: a cluster, a known/specific event, a class/category/ group/grouping/list/cluster/set of known events/subjects/locations/movements/activities, an unknown event, a class/ category/group/grouping/list/cluster/set of unknown events/ subjects/locations/movements/activities, and/or another event/subject/location/movement/activity/class/category/ group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device.

A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1−D1, wherein D1 is a pre-determined positive quantity (e.g. a constant time offset), (2) a second function of the item at time T1 and an item at time T1+D1, (3) a third function of the item at time Ti and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time Ti and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of: $X$, $Y$, $(X-Y)$, $(Y-X)$, $\mathrm{abs}(X-Y)$, $X^a$, $Y^b$, $\mathrm{abs}(X^a-Y^b)$, $(X-Y)^a$, $(X/Y)$, $(X+a)/(Y+b)$, $(X^a/Y^b)$, and $((X/Y)^a-b)$, wherein a and b are may be some predetermined quantities. For example, the function may simply be abs(X−Y), or (X−Y)^2, (X−Y)^4. The function may be a robust function. For example, the function may be (X−Y)^2 when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that X=(x_1, x_2, . . . , x_n) and Y=(y_1, y_2, . . . , y_n). The function may be a function of at least one of: x_i, y_i, (x_i−y_i), (y_i−x_i), abs(x_i−y_i), x_i^a, y_i^b, abs(x_i^a−y_i^b), (x_i−y_i)^a, (x_i/y_i), (x_i+a)/(y_i+b), (x_i^a/y_i^b), and ((x_i/y_i)^a−b), wherein i is a component index of the n-tuple X and Y, and 1<=i<=n, e.g. component index of x_1 is i=1, component index of x_2 is i=2. The function may comprise a component-by-component summation of another function of at least one of the following: x_i, y_i, (x_i−y_i), (y_i−x_i), abs(x_i−y_i), x_i^a, y_i^b, abs(x_i^a−y_i^b), (x_i−y_i)^a, (x_i/y_i), (x_i+a)/(y_i+b), (x_i^a/y_i^b), and ((x_i/y_i)^a−b), wherein i is the component index of the n-tuple X and Y. For example, the function may be in a form of sum {i=1}^n (abs(x_i/y_i)−1)/n, or sum_{i=1}^n w_i*(abs(x_i/y_i)−1), where w_i is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the i^{th} domain item is mapped to the j^{th} range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated.

The first section of the first time duration of the first TSCI may be a sliding section of the first TSCI. The second section of the second time duration of the second TSCI may be a sliding section of the second TSCI.

A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier.

The classifier of the at least one event may be trained based on the projection and the training TSCI associated with the at least one event. The at least one current TSCI may be classified/categorized based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

Channel/Channel Information/Venue/Spatial-Temporal Info/Motion/Object

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beamforming information (including feedback or steering matrices generated by wireless communication devices, according to a standardized process, e.g., IEEE 802.11 or another standard), transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, $L\_1$ norm, $L\_2$ norm, $L\_k$ norm for k>2, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, de-noising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car).

The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802,11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, post-processing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time.

For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STI/size/property/trait/habit/behavior, the venue, feature/fixture/furniture/barrier/material/machine/living thing/thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.).

The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc.

The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Wash. Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that our wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, time-stamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface (UI)/graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

Type 1 device (transmitter, or Tx) and Type 2 device (receiver, or Rx) may be on same device (e.g. RF chip/IC) or simply the same device. The devices may operate at high frequency band, such as 28 GHz, 60 GHz, 77 GHz, etc. The RF chip may have dedicated Tx antennas (e.g. 32 antennas) and dedicated Rx antennas (e.g. another 32 antennas).

One Tx antenna may transmit a wireless signal (e.g. a series of probe signal, perhaps at 100 Hz). Alternatively, all Tx antennas may be used to transmit the wireless signal with beamforming (in Tx), such that the wireless signal is focused in certain direction (e.g. for energy efficiency or boosting the signal to noise ratio in that direction, or low power operation when "scanning" that direction, or low power operation if object is known to be in that direction).

The wireless signal hits an object (e.g. a living human lying on a bed 4 feet away from the Tx/Rx antennas, with breathing and heart beat) in a venue (e.g. a room). The object motion (e.g. lung movement according to breathing rate, or blood-vessel movement according to heart beat) may impact/modulate the wireless signal. All Rx antennas may be used to receive the wireless signal.

Beamforming (in Rx and/or Tx) may be applied (digitally) to "scan" different directions. Many directions can be scanned or monitored simultaneously. With beamforming, "sectors" (e.g. directions, orientations, bearings, zones, regions, segments) may be defined related to the Type 2 device (e.g. relative to center location of antenna array). For each probe signal (e.g. a pulse, an ACK, a control packet, etc.), a channel information or CI (e.g. channel impulse response/CIR, CSI, CFR) is obtained/computed for each sector (e.g. from the RF chip). In breathing detection, one may collect CIR in a sliding window (e.g. 30 sec, and with 100 Hz sounding/probing rate, one may have 3000 CIR over 30 sec).

The CIR may have many taps (e.g. N1 components/taps). Each tap may be associated with a time lag, or a time-of-flight (tof, e.g. time to hit the human 4 feet away and back). When a person is breathing in a certain direction at a certain distance (e.g. 4 ft), one may search for the CIR in the "certain direction". Then one may search for the tap corresponding to the "certain distance". Then one may compute the breathing rate and heart rate from that tap of that CIR.

One may consider each tap in the sliding window (e.g. 30 second window of "component time series") as a time function (e.g. a "tap function", the "component time series"). One may examine each tap function in search of a strong periodic behavior (e.g. corresponds to breathing, perhaps in the range of 10 bpm to 40 bpm).

The Type 1 device and/or the Type 2 device may have external connections/links and/or internal connections/links. The external connections (e.g. connection 1110) may be associated with 2G/2.5G/3G/3.5G/4G/LTE/5G/6G/7G/NBIoT, UWB, WiMax, Zigbee, 802.16 etc. The internal connections (e.g., 1114A and 1114B, 1116, 1118, 1120) may be associated with WiFi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/1b/2/2a/a/b/c/d/e/f/g/h/i/j/k/l/m/n/o/p/ standard.

The Type 1 device and/or Type 2 device may be powered by battery (e.g. AA battery, AAA battery, coin cell battery, button cell battery, miniature battery, bank of batteries, power bank, car battery, hybrid battery, vehicle battery, container battery, non-rechargeable battery, rechargeable battery, NiCd battery, NiMH battery, Lithium ion battery, Zinc carbon battery, Zinc chloride battery, lead acid battery, alkaline battery, battery with wireless charger, smart battery, solar battery, boat battery, plane battery, other battery, temporary energy storage device, capacitor, fly wheel).

Any device may be powered by DC or direct current (e.g. from battery as described above, power generator, power convertor, solar panel, rectifier, DC-DC converter, with various voltages such as 1.2V, 1.5V, 3V, 5V, 6V, 9V, 12V, 24V, 40V, 42V, 48V, 110V, 220V, 380V, etc.) and may thus have a DC connector or a connector with at least one pin for DC power.

Any device may be powered by AC or alternating current (e.g. wall socket in a home, transformer, invertor, shore-power, with various voltages such as 100V, 110V, 120V, 100-127V, 200V, 220V, 230V, 240V, 220-240V, 100-240V, 250V, 380V, 50 Hz, 60 Hz, etc.) and thus may have an AC connector or a connector with at least one pin for AC power. The Type 1 device and/or the Type 2 device may be positioned (e.g. installed, placed, moved to) in the venue or outside the venue.

For example, in a vehicle (e.g. a car, truck, lorry, bus, special vehicle, tractor, digger, excavator, teleporter, bulldozer, crane, forklift, electric trolley, AGV, emergency vehicle, freight, wagon, trailer, container, boat, ferry, ship, submersible, airplane, air-ship, lift, mono-rail, train, tram, rail-vehicle, railcar, etc.), the Type 1 device and/or Type 2 device may be an embedded device embedded in the vehicle, or an add-on device (e.g. aftermarket device) plugged into a port in the vehicle (e.g. OBD port/socket, USB port/socket, accessory port/socket, 12V auxiliary power outlet, and/or 12V cigarette lighter port/socket).

For example, one device (e.g. Type 2 device) may be plugged into 12V cigarette lighter/accessory port or OBD port or the USB port (e.g. of a car/truck/vehicle) while the other device (e.g. Type 1 device) may be plugged into 12V cigarette lighter/accessory port or the OBD port or the USB port. The OBD port and/or USB port can provide power, signaling and/or network (of the car/truck/vehicle). The two devices may jointly monitor the passengers including children/babies in the car. They may be used to count the passengers, recognize the driver, detect presence of passenger in a particular seat/position in the vehicle.

In another example, one device may be plugged into 12V cigarette lighter/accessory port or OBD port or the USB port of a car/truck/vehicle while the other device may be plugged into 12V cigarette lighter/accessory port or OBD port or the USB port of another car/truck/vehicle.

In another example, there may be many devices of the same type A (e.g. Type 1 or Type 2) in many heterogeneous vehicles/portable devices/smart gadgets (e.g. automated guided vehicle/AGV, shopping/luggage/moving cart, parking ticket, golf cart, bicycle, smart phone, tablet, camera, recording device, smart watch, roller skate, shoes, jackets, goggle, hat, eye-wear, wearable, Segway, scooter, luggage tag, cleaning machine, vacuum cleaner, pet tag/collar/wearable/implant), each device either plugged into 12V accessory port/OBD port/USB port of a vehicle or embedded in a vehicle. There may be one or more device of the other type B (e.g. B is Type 1 if A is Type 2, or B is Type 2 if A is Type 1) installed at locations such as gas stations, street lamp post, street corners, tunnels, multi-storey parking facility, scattered locations to cover a big area such as factory/stadium/train station/shopping mall/construction site. The Type A device may be located, tracked or monitored based on the TSCI.

The area/venue may have no local connectivity, e.g., broadband services, WiFi, etc. The Type 1 and/or Type 2 device may be portable. The Type 1 and/or Type 2 device may support plug and play.

Pairwise wireless links may be established between many pairs of devices, forming the tree structure. In each pair (and the associated link), a device (second device) may be a non-leaf (Type B). The other device (first device) may be a leaf (Type A or Type B) or non-leaf (Type B). In the link, the first device functions as a bot (Type 1 device or a Tx device)

to send a wireless signal (e.g. probe signal) through the wireless multipath channel to the second device. The second device may function as an Origin (Type 2 device or Rx device) to receive the wireless signal, obtain the TSCI and compute a "linkwise analytics" based on the TSCI.

Various sound-enabled applications acutely demand a next-generation sound sensing modality with more advanced features: robust sound separation, noise-resistant, through-the-wall recovery, sound liveness detection against side attacks, etc. For example, robust sound separation can enable a smart voice assistant to have sustained performance over noisy environments. Being able to identify animate subjects accurately and quickly would improve the security of voice control systems against demonstrated audio attacks. Sensing behind an insulation can increase the operational range of a smart device to multiple rooms, and allows to retain sound-awareness of outside environments even in a soundproof space.

In order to enable the above advanced features holistically, the present teaching discloses "RadioMic," a sensing system that can capture sound and beyond based on radio signals, e.g. millimeter wave (mmWave). As illustrated in FIG. 1, RadioMic can detect, recover and classify sound from sources in multiple environments. It can recover various types of sounds, such as music, speech, and environmental sound, from both active sources (e.g., speakers or human throats) and passive sources (e.g., daily objects like a paper bag). When multiple sources present, RadioMic can reconstruct the sounds separately with respect to distance, which could not be achieved by classical beamforming in microphone arrays, while being immune to motion interference. RadioMic can also sense sound through walls and even soundproof materials as RF signals have different propagation characteristics than sound. In some embodiments, RadioMic, located in an insulated room (or in a room with active noise cancellation), can be used to monitor and detect acoustic events outside the room, offering both soundproof and awareness in the same time. Besides, RadioMic can also detect liveliness of a recorded speech and tell whether it is from a human subject or inanimate sources, providing an extra layer of security for IoT devices.

FIG. 1 illustrates an exemplary implementation environment 100 for a sound sensing system, e.g. RadioMic, using millimeter wave (mmWave) radio, according to some embodiments of the present disclosure. As shown in FIG. 1, RadioMic can include a device with a transmitter (Tx) antenna array 111 and a receiver (Rx) antenna array 112. In some embodiments, each of the transmitter (Tx) and receiver (Rx) arrays has multiple antennas. To sense sound in the environment, the Tx 111 can transmit mmWave signals, which may be received by different Rx antennas 112 sequentially after reflected by sounding and vibrating sources in a venue and other objects in the same venue.

In some embodiments, the Tx 111 is a Bot as described above; and the Rx 112 is an Origin as described above. While the Tx 111 and the Rx 112 are physically coupled to each other in FIG. 1, they may be separated in different devices in other embodiments. In some embodiments, the device including the Tx 111 and the Rx 112 serves like a radar, e.g. a mmWave radar. In some embodiments, RadioMic also includes a processor to process the received radar signal at the Rx 112. In various embodiments, the processor may be physically coupled to the Tx 111, the Rx 112, both, or neither.

RadioMic's design involves multiple challenges. First, sound-induced vibration is extremely weak, on the orders of μm (e.g., <10 μm on aluminum foil for source sound at ~85 dB). Human ears or microphone diaphragms have sophisticated structures to maximize this micro vibration. Speaker diaphragms or daily objects, however, alter the sound vibration differently, and create severe noise, combined with noise from radio devices. Second, an arbitrary motion in the environment interferes with the sound signal, especially when the sound-induced vibration is weak. Third, wireless signals are prone to multipath, and returned signals comprise static reflections, sound vibration, and/or its multiple copies. Four, due to the material properties, sounds captured from daily objects are fully attenuated on high frequencies beyond 2 kHz, which significantly impairs the intelligibility of the sensed sounds.

RadioMic can overcome these challenges in multiple distinct ways. In some embodiments, RadioMic uses a novel radio acoustics model that relates radio signals and acoustic signals. On this basis, it detects sound with a training-free module that utilizes fundamental differences between a sound and any other motion. In some embodiments, to reduce the effect of background, RadioMic filters and projects the signal in the complex plane, which reduces noise while preserving the signal's content, and further benefits from multipath and receiver diversities to boost the recovered sound quality. In some embodiments, RadioMic can also employ a radio acoustics neural network to solve the extremely ill-posed high-frequency reconstruction problem, which may leverage massive online audio datasets and require minimal RF data for training.

In some embodiments, RadioMic is implemented using a commercial off-the-shelf (COTS) mmWave radar. RadioMic can recover sounds from active sources such as speakers and human throats, and passive objects like aluminum foil, paper bag, or bag of chips. Based on a performance comparison with other works in different environments using diverse sound files at varying sound levels, RadioMic outperforms latest approaches in sound detection and reconstruction under various criteria. Furthermore, RadioMic can achieve multiple source separation and sound liveness detection.

In some embodiments, RadioMic is an RF-based sound sensing system that separates multiple sounds and operates through the walls. RadioMic can recover sound from passive objects and also detect liveness of the source. RadioMic uses a radio acoustics model from the perspective of Channel Impulse Response, which can be obtained from underlying RF signals and support training-free robust sound detection and high-fidelity sound reconstruction.

In some embodiments, RadioMic trains a radio acoustics neural network, requiring minimal RF training data, to enhance the sensed sound by expanding the recoverable frequencies and denoising. In some embodiments, RadioMic is implemented on low-cost COTS hardware to demonstrate multiple attractive applications.

Mechanics of the sound sensing using radio signals, which are named as radio acoustics, are described below. Sound is basically modulation of medium pressure through various mechanisms. In some embodiment, sound is generated by a vibrating surface, and the modulation signal travels through in place motion of air molecules. A vibrating surface could be a speaker diaphragm, human throat, strings of musical instrument such as a guitar, and many daily objects like a paper bag. In the case of speakers, motion on the speaker diaphragm modulates the signal, whereas in human throat, vocal cords create the vibration, with the mouth and lips operating as additional filters, based on the source-filter model. To sense the sound, the same mechanism is employed at the microphones to convert the changes in the air pressure into electrical signal, via suitable diaphragms and electrical circuitry. Microphone diaphragms are designed to be sensitive to air vibration and optimized to capture the range of audible frequencies (about 20 Hz to 2 kHz), and even beyond.

In some embodiments, mechanics of extracting sound from radio signals rely on the Doppler phenomenon and the relationship between the object vibration and the reflected signals. The vibration alters how the signals are reflected off the object surface propagate. Therefore, the reflection signals can be used to measure the tiny vibrations of an object surface in terms of Doppler shifts, from which the system can recover the sound.

In some embodiments, the vibration not only occurs at the source where sound is generated, but also on intermediary objects that are incited by the air. Most commonly, sound-modulated air molecules can cause μm level or smaller vibration on any object surface. The vibration amplitude may depend on material properties and various factors. Generally, sound vibrations are stronger at the source where they are generated (referred as active vibration sources), and much weaker at the intermediary objects (referred as passive vibration sources). Microphones typically only sense sound from active sources, as the air-modulated passive sound is too weak to further propagate to the microphone diaphragms. Differently, as radio acoustics sense sound directly at the source, the disclosed system RadioMic can reconstruct sound from both active sources and passive sources.

To illustrate the concept, one can place a radar in front of a guitar, and play the string G3 repeatedly, to provide the radio and microphone spectrograms. When the string is hit, it continues to vibrate (or move back and forth) in place to create the changes in the air pressure, and therefore create the sound. The radar senses the sound by capturing the motion of the strings, whereas the microphone captures the modulated air pressure at the diaphragm. Although the sensing mechanisms of microphones and radio are completely different in their nature, they can capture the same phenomenon, and the resulting signals are similar.

Starting with the mechanics of sound vibration, one can build the radio acoustics model. As explained previously, sound creates vibration (motion) on objects, which is proportional to the transmitted energy of sound from the air to the object and depends on multiple factors, such as inertia and signal frequency. Denoting the acoustic signal with a(t), one can model the displacement due to sound as:

$$x(t)=h \star a(t), \quad (1)$$

where h denotes vibration generation mechanism for an active source or the impulse response of the air-to-object interface for a passive object, and ★ represents convolution.

From the point view of physics, sound-induced vibration is identical to machinery vibration, except that sound vibration is generally of magnitude weaker. To model the sound vibration from RF signals, one could follow a model assuming the knowledge of the signal model and thus depending on the specific radio devices being used. In some embodiments, RadioMic establishes a model based on the Channel Impulse Response (CIR) of RF signals, which is independent of the underlying signals. By doing so, in principle, the model applies to any radio device that outputs high-resolution CIR, e.g. a frequency modulated carrier wave (FMCW) radar, an impulse radar, or others.

A CIR of an RF signal can be given as $$g(t, \tau) = \sum_{l=0}^{L-1} \alpha_l(t)\delta(\tau - \tau_l(t)), \quad (2)$$

where t and τ are referred as long time and short time respectively, L denotes number of range bins (sampling w.r.t. distance), $\alpha_l$ denotes complex scaling factor, $\tau_l$ is the roundtrip duration from range bin l, and δ(•) represents dirac delta function, indicating presence of an object. Assuming no multipath, and an object of interest at range bin l*, corresponding to time delay τ*, CIR of that range bin can be given as:

$$g(t,\tau^*)=\alpha_{l^*}(t)\exp(-j2\pi f_c \tau_l^*(t)), \quad (3)$$

where $f_c$ denotes the carrier frequency. Assuming the object to remain stationary in range bin l*, one can drop the variables τ*, and l*, convert time delay into range, and rewrite the CIR as:

$$g(t) = \alpha(t)\exp\left(-\frac{j2\pi R(t)}{\lambda}\right), \quad (4)$$

where R(t) denotes the actual distance of the object, and λ denotes the wavelength.

Considering a vibrating object (i.e., sound source), one can decompose the range value into the static and vibrating part as $R(t)=R_0+x(t)$. As can be seen, there is a direct relationship between the CIR g(t) and the phase of the returned signal. By extracting the phase, g(t) could be used to derive R(t), and therefore, the vibration signal, x(t). One can further omit the temporal dependency of α, assuming the object to be stationary, and the effect of displacement due to vibration on path loss to be negligible.

The above description assumes to have the vibrating object in the line of the radar solely, and does not account for other reflections from the environment. As suggested by Eqn. (4), g(t) lies on a circle in the in-phase and quadrature (IQ) plane with center at the origin. However, due to various background reflections, g(t) is actually superimposed with a background vector, and the circle center is shifted from the origin. Thus, g(t) can be written as:

$$g(t)=\alpha\,\exp(-j2\pi R(t)/\lambda)+\alpha_B(t)\exp(j\gamma(t))+w(t), \quad (5)$$

where $\alpha_B(t)$ and γ(t) are the amplitude and phase shift caused by the sum of all background reflections and vibrations, and w(t) is the additive white noise term. Eqn. (5) explains the received signal model and will be used to build a reconstruction block of RadioMic.

As shown in FIGS. 2A-2D, RadioMic could benefit various applications, including many that have not been easily achieved before. By overcoming limitations of today's microphone, RadioMic can enhance performance of popular smart speakers in noisy environments.

Figure 2A:
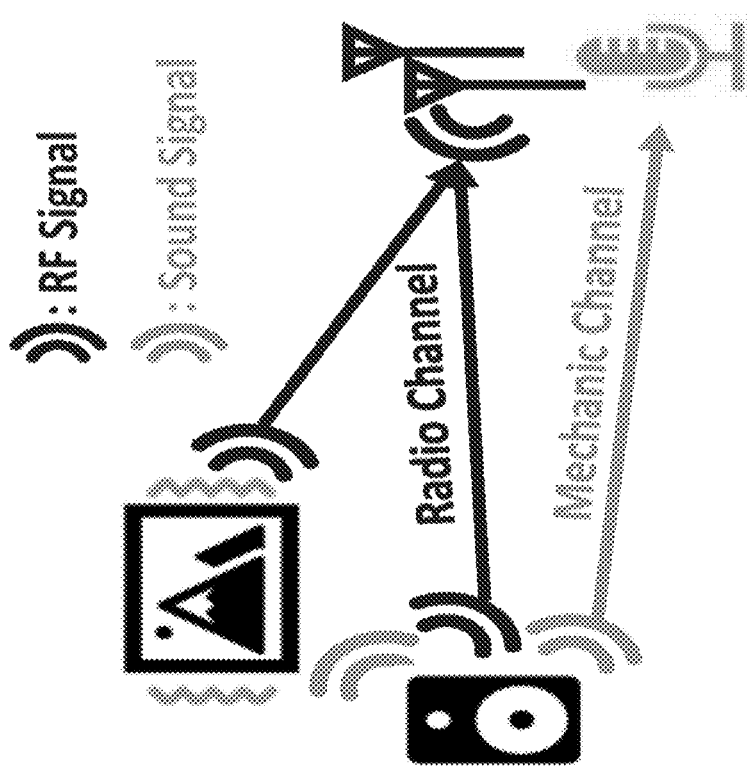
FIGS. 2A-2D illustrate different use cases of a sound sensing system, according to some embodiments of the present disclosure.

As shown in FIG. 2A, RadioMic can sense sound from both active and passive sources. Collecting spatially-separated audio helps to better understand acoustic events of human activities, appliance functions, machine states, etc.

Figure 2B:
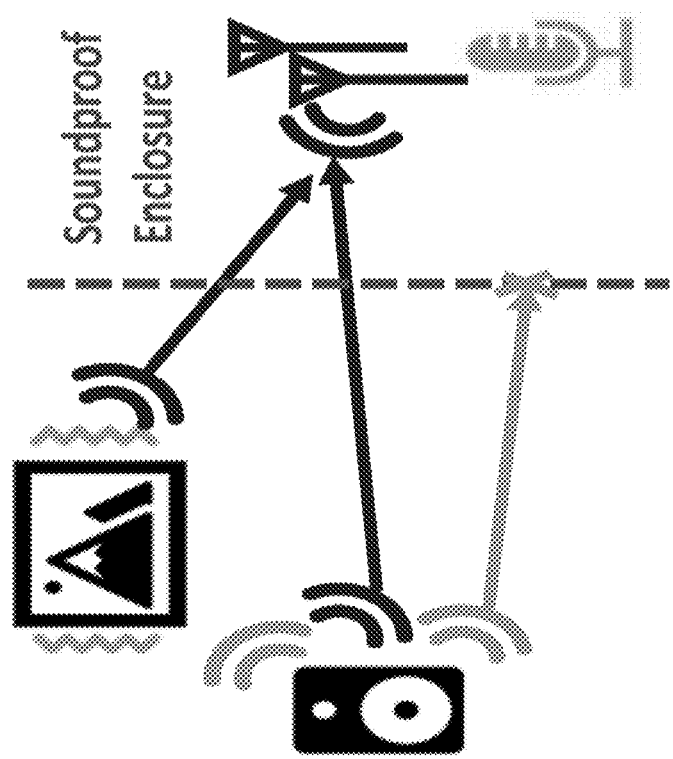

As shown in FIG. 2B, RadioMic can sense sound through soundproof materials, which will provide awareness of outside contexts while preserving the quiet space, which would be useful, for example, to monitor kid activities while working from home in a closed room.

Figure 2C:
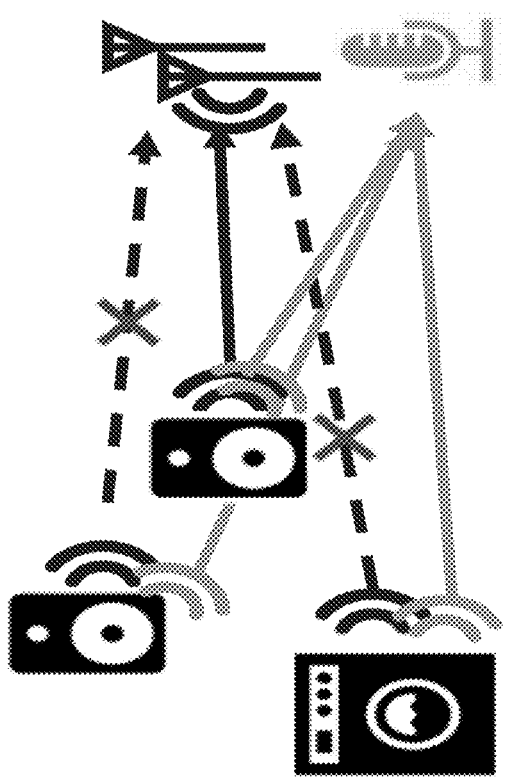

As shown in FIG. 2C, RadioMic can separate sound from multiple sources, which cannot be done by a microphone.

Figure 2D:
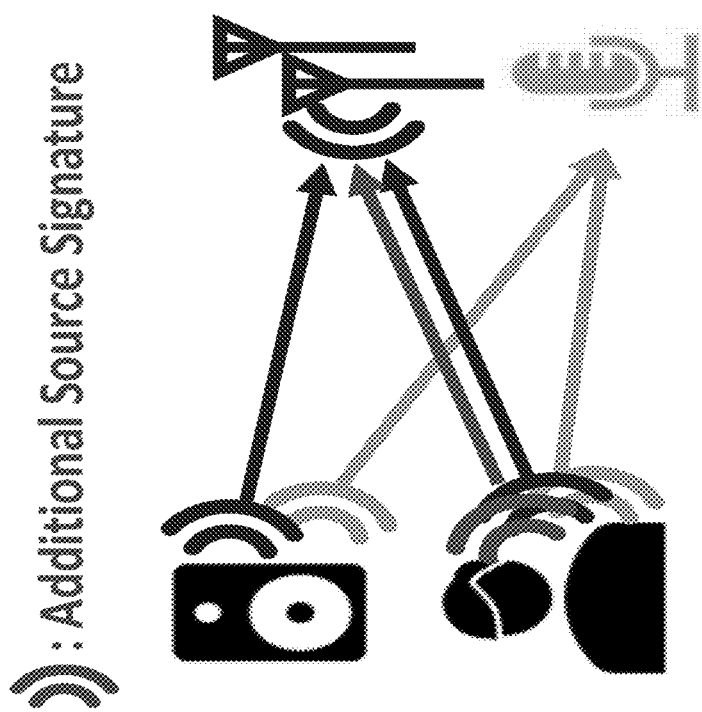

As shown in FIG. 2D, RadioMic can detect liveness of a sound source, e.g. with additional source signature, which can protect voice control systems from being attacked by inaudible voice or replayed audio.

In some embodiments, with mmWave entering more smart devices, RadioMic could also be combined with a microphone to leverage mutual advantages.

In some embodiments, RadioMic can be integrated with other existing wireless sensing applications. For example, a sleep monitoring currently employs microphone to detect coughs and snore, which may pose privacy concerns. This issue can be resolved when RadioMic is used. While remarkable progress has been achieved in RF-based imaging, RadioMic could offer a channel of the accompanying audio there.

Figure 3:
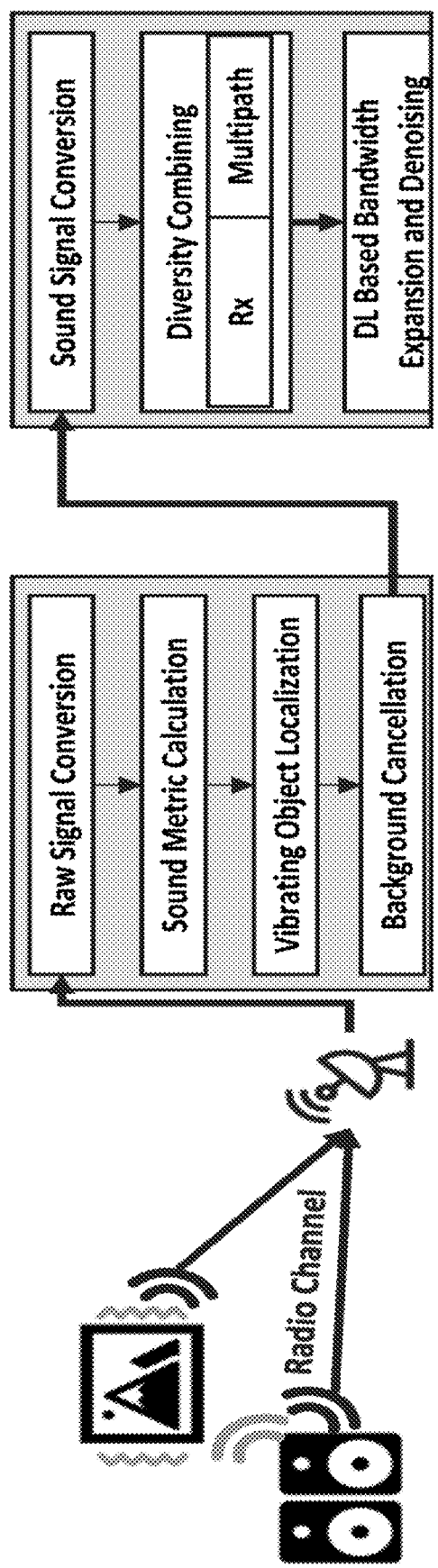
FIG. 3 illustrates a diagram showing operations performed by a sound sensing system based on mmWave radio signal, according to some embodiments of the present disclosure.

In some embodiments, RadioMic first extracts CIR from raw RF signals. In some embodiments, RadioMic detects sound vibration and recovers the sound, while rejecting non-interest motion. In addition, RadioMic feeds the recovered sound into a neural network for enhancement. FIG. 3 shows an overall pipeline of operations performed by RadioMic, according to some embodiments.

In some embodiments, RadioMic is implemented mainly using a COTS FMCW mmWave radar, although RadioMic can work with other mmWave radios that report high-resolution CIR such as an impulse radar as well. In some embodiments, CIR on impulse radar can also been exploited.

In some embodiments, an FMCW radar transmits a single tone signal with linearly increasing frequency, called a chirp, and captures the echoes from the environment. Time delay of the echoes could be extracted by calculating the amount of frequency shift between the transmitted and received signals, which can be converted to a range information. This range information is used to differentiate an object from the other reflectors in the environment. In order to obtain the range information, the frequency shifts between transmitted and received signals are calculated by applying FFT, which can be called Range-FFT. The output of Range-FFT can be considered as CIR, $g(t,\tau)$, and the above modeling could be applicable.

In some embodiments, RadioMic further obtains the so-called range-Doppler spectrogram from the CIR, which can be extracted by a short-time Fourier Transform (STFT) operation. STFT is basically FFT operations applied in the t dimension in $g(t,\tau)$ for subsets of long-time indices, called frames. One can denote the output range-Doppler spectrograms as $G(f, r, k)$, where $f \in (-N_s/2, N_s/2)$ denotes frequency shift, r corresponds to range bins (equivalent to $\tau_l$), and k is the frame index. G is defined for both positive and negative frequencies, corresponding to different motion directions of the objects.

As any range bin can have sound vibration, it is critical to have a robust detection module that can label both range bins and time indices effectively. Methods such as constant false alarm rate (CFAR) or Herfindahl-Hirschman Index (HHI) may not be robust, as the system should be triggered only by sound vibration but not arbitrary motion.

In some embodiments, RadioMic leverages the physical properties of sound vibration. Mainly, RadioMic relies on the fact that a vibration signal creates both positive and negative Doppler shifts, as it entails consequent displacement in both directions. This forward and backward motion is expected to have the same amplitudes at the same frequency bins, but with the opposite signs as the total displacement is zero. This would result in symmetric spectrograms. RadioMic exploits this observation with a novel metric for robust sound detection.

To define a sound metric, let $G^+(f, r, k)$ denote the magnitude of the positive frequencies of range-Doppler spectrogram $G(f, r, k)$, i.e., $G^+(f, r, k)=|G(f, r, k)|$ for $f \in (0, N_s/2)$. Similarly, one can define $G^-(f, r, k)$ as $G^-(f, r, k)=|G(f, r, k)|$ for negative frequencies $f \in (-N_s/2, 0)$. Note that the values of $G^+$ and $G^-$ are always positive, as they are defined as magnitudes, and would have non-zero mean even when there is no signal, due to the additive noise. Calculating the cosine distance or correlation coefficient would result in high values, even if there is only background reflection. In order to provide a more robust metric, one can subtract the noise floor from both $G^+$ and $G^-$ and denote the resulting matrices with $\hat{G}^+$ and $\hat{G}^-$. Then, instead of using standard cosine distance, one can change the definition to enforce similarity of the amplitude in $\hat{G}^+$ and $\hat{G}^-$:

$$m(r, k) = \frac{\sum_f |\hat{G}^+(f, r, k) \hat{G}^-(f, r, k)|^2}{\max\left(\sum_f |\hat{G}^+(f, r, k)|^2, \sum_f |\hat{G}^-(f, r, k)|^2\right)}. \quad (6)$$

In some embodiments, RadioMic calculates the sound metric as in Eqn. (6) for each range bin r, and for each time-frame k, resulting in a sound metric map, music sound results in high values of the sound metric, whereas arbitrary motion is suppressed significantly, due to asymmetry in the Doppler signature and power mismatches. This shows the responsiveness of sound metric to vibration, while keeping comparatively lower values for random motion.

In some embodiments, to detect vibration, RadioMic uses a median absolute deviation based outlier detection algorithm, and only extracts outliers with positive deviation. In some embodiments, an outlier based scheme outperforms a fixed threshold. Additionally, this approach also adapts to various motion and sounds of diverse amplitudes, including those from active sources and passive sources.

As the sound detection algorithm runs on the range bins, it can detect multiple range bins with sound. The radio signals in these range bins may be processed separately by RadioMic. This enables detection of multiple sources and reconstruction of each sound signal separately. As a byproduct, it also locates at which bin does the sound occur, and reduces interference.

In some embodiments, having extracted the time indices and the range information about active or passive vibration sources in the environment, RadioMic extracts raw sound signals. Using the signal model in Eqn. (5), RadioMic recovers the acoustic signal by first filtering out the interference and background and approximating the remaining signal with a line fit to further reduce noise.

In some embodiments, the system can apply an FIR high-pass filter as the changes in the background usually have much lower frequencies. The resulting signal, $\hat{g}(t)$ can be given as:

$$\hat{g}(t) \approx \alpha \exp(-j2\pi R(t)/\lambda) - \alpha \exp(j\gamma_R) + \hat{w}(t), \quad (7)$$

where $\hat{w}(t)$ is the filtered noise term, and $\alpha \exp(j\gamma_R) \approx \alpha \exp(-j2\pi R_0/\lambda)$ is the center of a circle.

The signal component, $\exp(-jg\pi R(t)/\lambda)$, remains mostly unchanged, due to the frequencies of interest with sound signals, and this operation moves the arc of the vibration circle to the origin in the in-phase and quadrature (IQ) plane. Furthermore, this operation reduces any drifting in IQ plane, caused by the hardware.

In some embodiments, the curvature of the arc of the vibration circle is in the order of 1° for μm displacement with a mmWave device, by projecting the arc, $\alpha \exp(-j2\pi$ R(t)/λ), onto the tangent line at α exp(−j2π R₀/λ), one can approximate ĝ(t) as $$\hat{y}(t) = m + nx(t) + \hat{w}(t) - \alpha \exp(j\gamma_R), \quad (8)$$

where m=exp(−2π R₀/λ), and n=α−2π/λ exp(−j(π/2+2π R₀/λ)).

Because $\alpha_R \exp(j\gamma_R) \approx \alpha \exp(-j2\pi R_0/\lambda)$, ĝ(t) can be further simplified as $$\hat{g}(t) \approx nx(t) + \hat{w}(t), \quad (9)$$

which suggests that, ĝ(t) already has the real-valued sound signal x(t), scaled and projected in complex plane, with an additional noise. Because the projection onto an arbitrary line does not change noise variance, one can estimate x(t) with minimum mean squared error (MMSE) criteria. The estimate is given as:

$$\hat{x}(t) = \mathcal{R}\{\hat{g}(t)\exp(-j\hat{\theta})\}, \quad (10)$$

where $\mathcal{R}$ is the real value operator. Angle $\hat{\theta}$ can be found as:

$$\hat{\theta} = \arg\min_\theta \|\hat{g}(t) - \mathcal{R}\{\hat{g}(t)\exp(-j\theta)\} \exp(j\theta)\|^2. \quad (11)$$

In order to mitigate any arbitrary motion and reject noise, the disclosed system can first project the samples on the optimum line, then calculate spectrogram. Afterwards, the disclosed system can extract the maximum of two spectrograms (i.e. max{G⁺, G⁻}) and apply inverse-STFT to construct real-valued sound signal. This is different than extracting maximum of the two spectrograms immediately, or extracting one side only, as the system first reduces the noise variance by projection. This also ensures a valid sound spectrogram, as the inverse spectrogram needs to result in a real-valued sound signal.

In some embodiments, the raw sound output does not directly result in very high quality sound, due to various noise sources and the extremely small displacement on the object surface. To mitigate these issues, one can utilize two physical redundancies in the system: 1) receiver diversity offered by multiple antennas that can be found in many radar arrays, and 2) multipath diversity. Multiple receivers or receive antennas can sense the same vibration signal from slightly different locations, and combination of these signals could enable a higher signal-to-noise ratio (SNR). In addition, multipath environment enables to observe a similar sound signal in multiple range bins, which could be used to further reduce the noise levels. To exploit these multiple diversities, one can employ a selection combining scheme. Mainly, silent moments are used to get an estimate for each multipath component and receiver (or receive antenna). When sound is detected, the signal with the highest SNR is extracted. One may only consider nearby bins when combining multipath components, in order to recover sound from multiple sources.

Even though the aforementioned process reduces multiple noise sources, and optimally creates a sound signal from radio signals, the recovered sound signals face two issues. First, the above process cannot recover frequencies beyond 2 kHz, noted as high-frequency deficiency, which is a problem as the articulation index, a measure of the amount of intelligible sound, is less than 50% for 2 kHz band-limited speech. Second, the recovered sound is a noisy copy of the original sound. As the vibration on object surfaces is on the order of μm, phase noise and other additive noises still exist.

High frequencies beyond 2 kHz are attenuated fully in the recovered sound, as the channel h in Eqn. (1) removes useful information in those bands. Referring back to the above modeling of the signal, the output signal x̂(t) is a noisy copy of x(t), which could be written as:

$$\hat{x}(t) \approx x(t) + \hat{w} = h \star a(t) + \hat{w}(t), \quad (12)$$

from Eqn. (1). This shows the output of the air pressure-to-object vibration channel (or mechanical response of a speaker). In order to recover a(t) fully, one needs to invert the effect of h. However, classical signal processing techniques like spectral subtraction or equalization cannot recover the entire band, as the information at the high frequencies have been lost.

To overcome these issues, namely, to reduce the remaining noise and reconstruct the high frequency part, the disclosed system uses deep learning. In some embodiments, the disclosed system builds an auto-encoder-based neural network model, named as radio acoustics networks (RANet). Theoretical limitations are strict in RadioMic, as there is severer noise, and stronger band-limit constraints on the recovered speech (expanding 2 kHz to 4 kHz), in addition to the need for solving both problems together.

Figure 4:
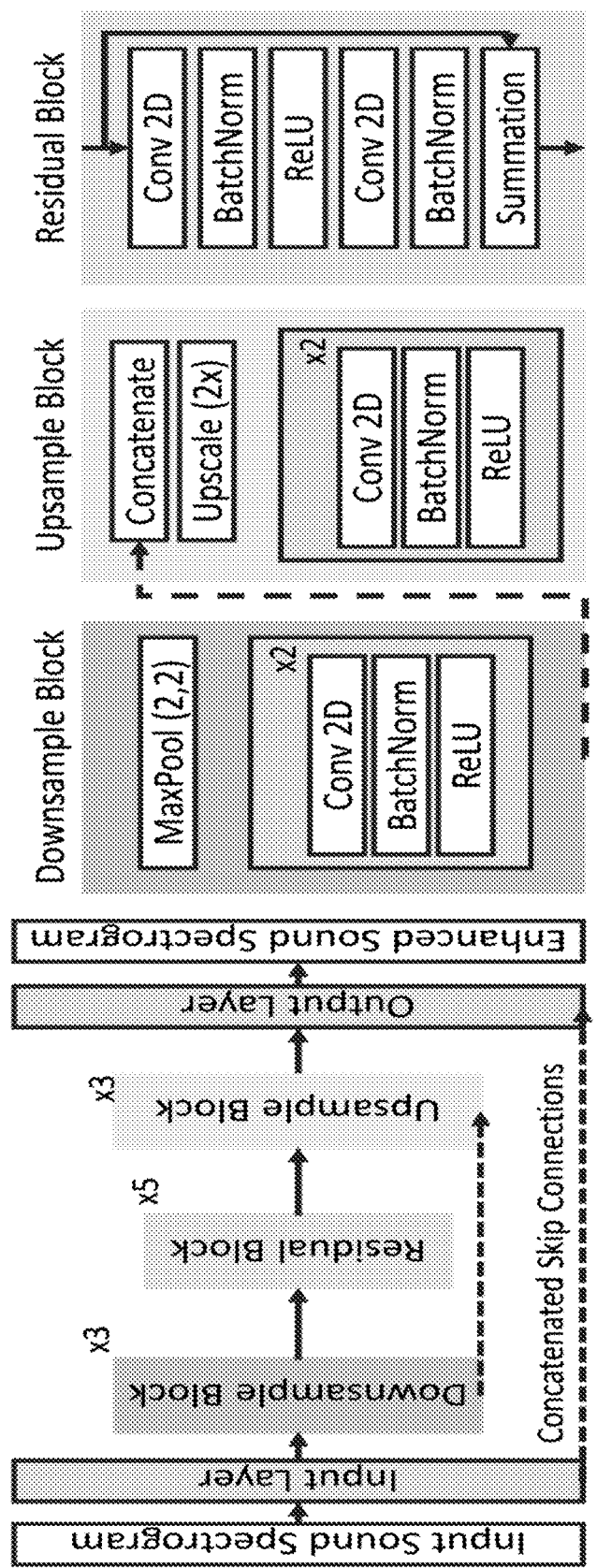
FIG. 4 illustrates a diagram of a structure of a neural network model, according to some embodiments of the present disclosure.
Figure 5:
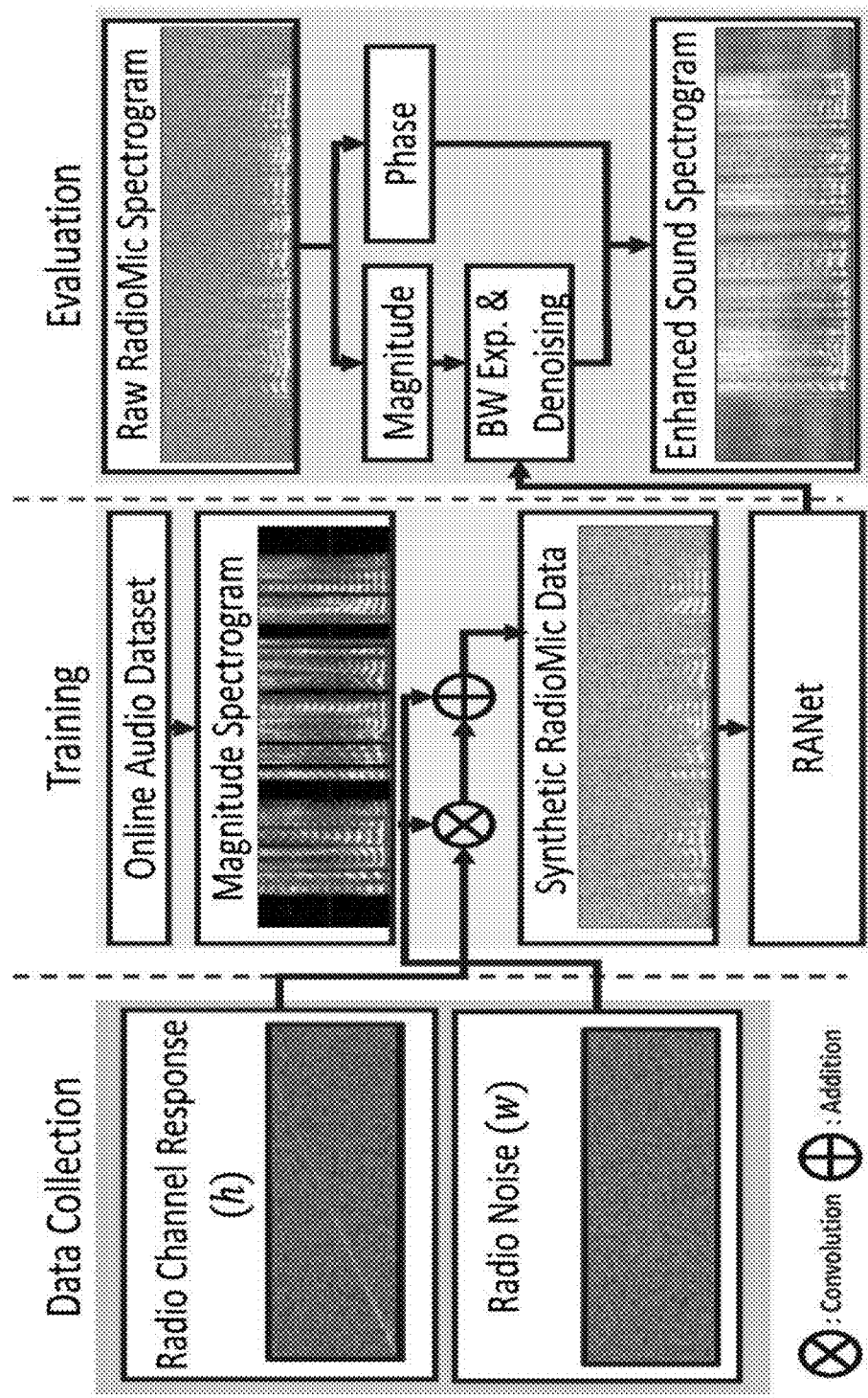
FIG. 5 illustrates a processing flow of data augmentation, training and evaluation of a neural network model, according to some embodiments of the present disclosure.

FIG. 4 illustrates the structure of RANet, with the entire processing flow of data augmentation, training, and evaluation illustrated in FIG. 5. As shown in FIG. 4, RANet comprises downsampling, residual and upsampling blocks, which are connected sequentially, along with some residual and skip connections. On a high level, the encoding layers (downsampling blocks) are used to estimate a latent representation of the input spectrograms (e.g. similar to images); and decoding layers (upsampling blocks) are expected to reconstruct high-fidelity sound. Residual layers in the middle are added to capture more temporal and spatial dependencies by increasing the receptive field of the convolutional layers, and to improve model complexity. In some embodiments, RANet takes input spectrograms of size (128×128), as grayscale images, and uses (3×3) strided convolutions, with number of kernels doubling in each layer of downsampling blocks, starting from 32. In the upsampling blocks, the number of kernels is progressively reduced by half, to ensure a symmetry between the encoder and decoder. In the residual blocks, the number of kernels does not change, and outputs of each double convolutional layer are combined with their input. One can use residual and skip connections to build RANet, as these are shown to make the training procedure easier, especially for deep neural networks.

As this is a relatively deep neural network for an extremely challenging inverse problem, a successful training process requires extensive data collection. However, collecting massive RF data is costly, which is a practical limitation of many learning-based sensing systems. On the other hand, there have seen a growing, massive audio datasets becoming available online. In some embodiments, instead of going through an extensive data collection procedure, RadioMic exploits the disclosed radio acoustics model and translates massive open-source datasets to synthetically simulated radio sound for training. In some embodiments, two parameters are particularly needed to imitate radio sound with an audio dataset, i.e., the channel h and noise w as in Eqn. (12). The system can use multiple estimates for these parameters to cover different scenarios, and artificially create radar sound at different noise levels and for various frequency responses, thus allowing the system to train RANet efficiently with very little data collection overhead. Furthermore, this procedure ensures a rigorous system evaluation, as only the evaluation dataset includes the real radio speech.

In some embodiments, using the trained model, RANet uses raw radar sound as input, extracts magnitude spectrograms that will be used for denoising and bandwidth expansion. Output magnitude spectrograms of RANet is combined with the phase of the input spectrograms, the time-domain waveform of the speech is constructed. In some embodiments, in order to reduce the effect of padding on the edges, and capture long-time dependencies, only the center parts of the estimated spectrograms are used, and inputs are taken as overlapping frames with appropriate paddings in two sides.

While RadioMic is not limited to a specific type of radar, one can use an FMCW mmWave radar for implementation, e.g. a COTS mmWave radar with a real-time data capture board. In some embodiments, it works on 77 GHz with a bandwidth of 3.52 GHz. In some embodiments, the radar device has 3 transmitter (Tx) and 4 receiver (Rx) antennas, with a sampling rate set at 6.25 kHz, which enables to sense up to 3.125 kHz, close to human sound range, while avoiding too high duty cycle on the radar. One can use two Tx antennas of the device. This enables 8 virtual receivers, due to the placement of antennas. The range resolution in the setting is 4.19 cm, and different objects placed apart by 4.19 cm with respect to the radar axis could be separated by RadioMic.

In some embodiments, applying Range-FFT, extracted CIR results in (8×256×6250) samples per second. The system can extract range-Doppler spectrograms using frame lengths of 256 samples (≈40 ms) with 75% overlap, and periodic-Hanning window. The selection of window function ensures perfect reconstruction, and has good sidelobe suppression properties, to ensure reduced effect of DC sidelobes on symmetry of range-Doppler spectrograms.

In some embodiments, to create synthetic data for training RANet, one can play a frequency sweep at various locations, and extract the radio channel response h. To account for fluctuations, one can apply a piecewise linear fit to the measured h, and apply added randomness to capture fluctuations. To capture noise characteristics, one can collect data in an empty room without any movement. Noise from each range bin is extracted, which are then added to the synthetic data, with varying scaling levels to account for different locations.

In some embodiments, the system downsamples the input audio files to 8 kHz, and calculates spectrograms using 40 ms windows (256 samples). When using the radar sounds as input, the system upsamples those audio files to 8 kHz prior to extracting the outputs. In some embodiments, inputs to the neural network are taken as 128 samples (≈1s), where only the middle 32 samples (≈0.25s) are used for reconstruction and error calculation.

In some embodiments, the system can use L2 loss between the real and estimated spectrograms. Prior to calculating the error, the system can apply a mapping of $\log(1+G)$, where G denotes a spectrogram. The system can randomly select 2.56 million spectrograms for creating synthetic input/output data, and train the network for 10 epochs.

Different modules of RadioMic can be placed in multiple places, such as office space, home and an acoustically insulated chamber. It is non-trivial to evaluate the quality of sound. While there are quite many different metrics in the speech processing literature, one can adopt perceptual evaluation of speech quality (PESQ), log-likelihood ratio (LLR) and short-time intelligibility index (STOI). PESQ tries to extract a quantitative metric that can be mapped to mean-opinion-score, without the need for user study, and reports values from 1 (worst) to 5 (best). LLR measures the distance between two signals, and estimates values in 0 (best) to 2 (worst). STOI is another measure of intelligibility of the sound, and reports values in (0,1) with 1 the best. One can avoid reporting SNR between the reference and reconstructed sound, as it does not correlate with human perception. Rather, one can report SNR using the noise energy estimated from silent moments, as it is used by RadioMic during raw sound data extraction and it gives a relative idea on the amount of noise suppression.

In some embodiments, the data collection for detection analysis includes random motions, such as standing up and sitting repeatedly, walking, running, and rotating in place, as well as static reflectors in the environment, and human bodies in front of the radar. On the other hand, the system can also collect data using multiple sound and music files with active and passive sources. More importantly, one can collect motion and sound data at the same time to see if RadioMic can reject these interferences successfully.

To illustrate the gains coming from the disclosed sound metric, one can implement and compare with other methods: 1) HHI (UWHear), which uses HHI and requires some training to select an appropriate threshold; and 2) CFAR (mmVib), which requires knowing the number of vibration sources a prior, and extracts the highest peaks. To imitate this approach and provide a reasonable comparison, one can apply CFAR detection rule at various threshold levels, and remove the detections around DC to have a fairer comparison. Additionally, one can also compare hard thresholding (RadioMic-T) with the outlier-based detector (RadioMic-O). Based on the comparison results, while RadioMic-T is slightly worse than RadioMic-O, the other methods fail to distinguish random motion from the vibration robustly, which prevents them from practical applications as there would be arbitrary motion in the environment.

One can investigate the detection performance of RadioMic at different distances azimuth angles (with respect to the radar) using an active source (a pair of speakers) and a passive source (aluminum foil of size 4×6 inches). In some embodiments, one can use 5 different sound files for each location, three of which are music files, and two are human speech. In some embodiments, RadioMic can robustly detect sound up to 4m in an active case with 91% mean accuracy, and up to 2m in the passive source case with %70 accuracy, both with a field of view of 90°. Passive source performance is expected to be lower, as the vibration is much weaker.

To further evaluate detection performance of RadioMic with passive materials, one can conduct experiments with additional daily materials, such as picture frames, paper bags, or bag of chips. Many different materials enable sound detection using RadioMic. Even at a lower rate, some sound signal is detected for particular instances as the evaluation is done with frames with 40 ms duration. The performance could be improved by temporal smoothing, if the application scenario requires a lower miss-detection ratio.

In some embodiments, one can also investigate the effect of sound amplitude on the detection ratio from a passive object. One can reduce the amplitude of the test files from 85 dB to 60 dB, with a 5 dB step, and measure the detection rates. The results show that RadioMic outperforms existing approaches, especially when the amplitude is lower. Detecting sound at even lower levels is a common challenge for non-microphone sensing due to the extremely weak vibrations.

In some embodiments, the sound signal could be approximated with a linear projection on IQ plane, where the optimum angle could be obtained by signal-to-noise maximizing projection. Although this approach maximizes the signal SNR, it may not result in perceptually higher quality sound, as SNR does not relate to the human perception. To that end, one can test multiple projection angles deviated from the RadioMic's optimum angle, and generate results using LLR and STOI for these angles. In some embodiments, the results indicate the best results for projecting at 0°, and the worst at 90° with a monotonic decrease in between, which is consistent with the line model. This further indicates that an optimal scheme can achieve higher performance than an arbitrary axis.

In some embodiments, to compare the disclosed method with other works, one may employ only the raw reconstruction without RANet. For this comparison, one can use an active speaker at 1m away, with various azimuth angles as further distances sometimes report unstable performance metrics. Overall, RadioMic outperforms both UWHear and mmVib, for just the raw sound reconstruction, and it further improves the quality of the sound with additional processing blocks. With gains from diversity combining and deep learning, one can investigate the effect of each component on a dataset using a passive source. Overall, each of the additional diversity combining schemes improves the performance with respect to all metrics. At the same time, RANet reduces the total noise levels significantly and increases PESQ. RANet yields a worse value with LLR, which is due to the channel inversion operation of h applied on the radar signal. While an optimal channel recovery operation is demanded, RANet is trained on multiple channel responses and only approximates to h. Consequently, the channel inversion applied by RANet is expected to be sub-optimal. Then STOI metric shows a higher variation, which is due to high levels of noise in the sample audio files in the input. In case of large noise, RANet learns to combat the effect of noise w, instead of inverting h, and outputs mostly empty signals. When there is enough signal content, RANet improves the intelligibility further.

To investigate sound recovery from varying locations and angles, one can investigate the raw SNR output for active and passive sources. In some embodiments, nearby locations have higher SNR, allowing better sound recovery, and the dependency with respect to the angle is rather weak. Increasing distance reduces the vibration SNR strongly, (e.g., from 20 dB at 1m to 14 dB at 2m for an active source) possibly due to the large beamwidth of the radar device and high propagation loss.

In some embodiments, one can test both active and passive sources at various sound levels, by investigating the SNR with respect to sound amplitude, where the calibration is done by measuring the sound amplitude at 0.5m away from the speakers, at 300 Hz. Generally, the SNR decreases with respect to decreasing sound levels. At similar sound levels, a passive source, aluminum foil, can lose up to 10 dB compared to an active source. In some embodiments, RadioMic retains a better SNR with decreasing sound levels than increasing distance, which indicates that the limiting factor for large distances is not the propagation loss, but the reflection loss, due to relatively smaller surface areas. Hence, with more directional beams (e.g. transmit beamforming, or directional antennas), effective range of the RadioMic could be improved, as low sound amplitudes also look promising for some recovery.

In some embodiments, two different synthesized audio files are used in order to show potential differences between the nature of active and passive sources. In this setting, the passive source (aluminum foil) is placed at 0.5m away and active source is located at 1m. The results show that active source (speaker diaphragm) have more content in the lower frequency bands, whereas passive sound results in more high frequency content, due to the aggressive channel compensation operation on h. More detailed comparisons are provided in Table 1.

One can further validate RadioMic in NLOS operations. To that end, in addition to the office area, one can conduct experiments in an insulated chamber, which has a double glass layer on its side. This scenario is representative of expanding the range of an IoT system to outside rooms from a quiet environment. In this particular scenario, one can test both the passive source (e.g. aluminum foil), and the active source (e.g. speaker). As additional layers would attenuate the RF reflection signals further, one can test NLOS setup at slightly closer distances, with active speaker at 80 cm and the passive source at 35 cm away. Detailed results are in Table 1. As seen, insulation layers do not affect RadioMic much, and LOS and NLOS settings perform quite similar. Some metrics even show improvement in NLOS case due to shorter distances.

TABLE 1

Active vs. Passive Source Comparison

| Setup | SNR | PESQ | LLR | STOI |
|---|---|---|---|---|
| LOS, Active | 24.7 | 0.84 | 1.61 | 0.55 |
| LOS, Passive | 10.4 | 1.20 | 1.57 | 0.61 |
| NLOS, Active | 29.4 | 1.12 | 1.52 | 0.58 |
| NLOS, Passive | 8.8 | 1.36 | 1.57 | 0.64 |

In some embodiments, RadioMic can also capture vocal folds vibration from human throat, as another active source. Starting with humming in front of the speaker at a quiet 60 dB level, one can collect multiple recordings from a user. Although RadioMic is not trained with a frequency response h from human throat, it can still capture some useful signal content. On the other hand, intelligibility of such speech is rather low, comparing to other sources, and RANet sometimes does not estimate the actual speech. The performance of RadioMic regarding human throat could be improved as well with a massive RF data from human throat.

In some embodiments, RadioMic can also be used for multiple source separation and to classify sound sources. Separation of multiple sound sources would enable multi-person sensing, or improved robustness against interfering noise sources. In order to illustrate feasibility, one can play two different speech files simultaneously from left and right channels of the stereo speakers. For example, one can place right speaker at 0.75m, and left speaker at 1.25m. This results in two spectrograms extracted by RadioMic, along with a microphone spectrogram. The microphone spectrogram extracts mixture of multiple sources, and is prone to significant interference. In contrast, RadioMic signals show much higher fidelity, and two person's speech can be separated from each other well. RadioMic can achieve more features in one system, in addition to the source separation capability. Higher fidelity may be pursued by using RadioMic in tandem with a single microphone.

As another application, one can investigate feasibility of sound source classification. As RadioMic senses at source of the sound, it captures the additional physical characteristics of the sound generation mechanism simultaneously. It turns out the disclosed system RadioMic can differentiate the source of a sound between a human and an inanimate source like a speaker. This is a critical application as it is well-known that today's microphones all suffer from inaudible attacks and replay attacks due to the hardware defects. The results show that RadioMic can enable sound liveliness detection, with unprecedented response times. In one experiment, a user recites five different sentences, in two different languages, and the speech is recorded using a condenser microphone. Afterwards, the same sound is played through speakers at the same distance, at a similar sound level, to capture RadioMic output.

Based on the results, the human throat shows a weaker amplitude around DC component. This is because the reflection coefficients of speakers and human throat vary significantly, a phenomenon utilized for material sensing. Due to minute body motions and the movement of the vocal tract, the reflection energy of human throat varies more over time and has stronger sidelobes. Due to skin layer between vocal cords and the radar, human throat applies stronger low-pass filtering on the vibration compared to speakers, which relates to the frequencies of interest for sound. In some embodiments, to enable RadioMic for liveness detection, one can implement a basic classifier based on these results. In some embodiments, the system can use the ratio of the energy in motion affected bands (35-60 Hz) over the entire radar spectrogram as an indicator for liveness. In some embodiments, RadioMic can classify the sources with 95% accuracy with only 40 ms of data, which increases to 99.2% by increasing to 320 ms. RadioMic promises a valuable application here as it can sense the sound and classify the source at the same time.

The present teaching thus discloses RadioMic, a mmWave radar based sound sensing system, which can reconstruct sound from sound sources and passive objects in the environment.

Using the tiny vibrations that occur on active sources (e.g., a speaker or human throat) or object surfaces (e.g., paper bag) due to ambient sound, RadioMic can detect and recover sound as well as identify sound sources using a novel radio acoustics model and neural network. RadioMic can work through walls, even a soundproof one. To convert the extremely weak sound vibration in the radio signals into sound signals, RadioMic uses radio acoustics, and training-free approaches for robust sound detection and high-fidelity sound recovery. It exploits a neural network to further enhance the recovered sound by expanding the recoverable frequencies and reducing the noises. RadioMic can translate massive online audios to synthesized data to train the network, and thus minimize the need of RF data. Extensive experiments in various settings show that RadioMic outperforms existing approaches significantly and benefits many applications.

In some embodiments, more advanced hardware and sophisticated beamforming could underpin better performance of RadioMic. In some embodiments, RANet mitigates the fundamental limit of high-frequency deficiency, which uses 1-second window with limited RF training data. In some embodiments, better quality could be achieved by exploiting long-term temporal dependencies with a more complex model, given more available RF data. More RF data from human throat can lead to a better performance for human speech sensing.

In some embodiments, RadioMic and microphones are complementary. Using suitable deep learning techniques, the side information from RadioMic could be used in tandem with microphone to achieve better performance of sound separation and noise mitigation than microphone alone. With RadioMic, one can build a security system for sound liveness detection against side-channel attacks, or explore RadioMic with mmWave imaging and other sensing.

Figure 6:
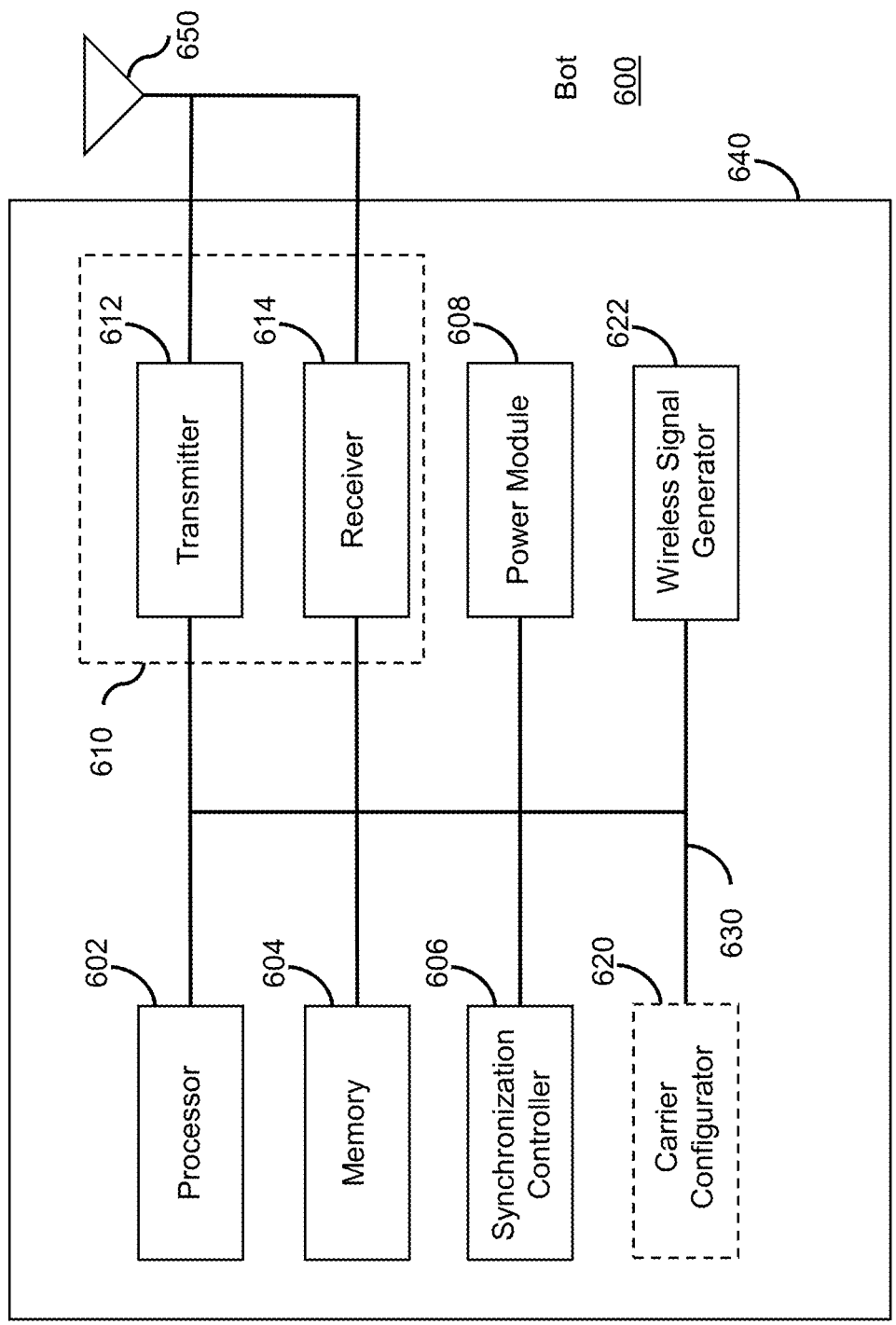
FIG. 6 illustrates an exemplary block diagram of a first wireless device of a sound sensing system, according to some embodiments of the present disclosure.

FIG. 6 illustrates an exemplary block diagram of a first wireless device, e.g. a Bot 600, of a sound sensing system, according to some embodiments of the present disclosure. The Bot 600 is an example of a device that can be configured to implement the various methods described herein. As shown in FIG. 6, the Bot 600 includes a housing 640 containing a processor 602, a memory 604, a transceiver 610 comprising a transmitter 612 and receiver 614, a synchronization controller 606, a power module 608, an optional carrier configurator 620 and a wireless signal generator 622.

In this embodiment, the processor 602 controls the general operation of the Bot 600 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 604, which can include both read-only memory (ROM) and random access memory (RAM), can provide instructions and data to the processor 602. A portion of the memory 604 can also include non-volatile random access memory (NVRAM). The processor 602 typically performs logical and arithmetic operations based on program instructions stored within the memory 604. The instructions (a.k.a., software) stored in the memory 604 can be executed by the processor 602 to perform the methods described herein. The processor 602 and the memory 604 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 610, which includes the transmitter 612 and receiver 614, allows the Bot 600 to transmit and receive data to and from a remote device (e.g., an Origin or another Bot). An antenna 650 is typically attached to the housing 640 and electrically coupled to the transceiver 610. In various embodiments, the Bot 600 includes (not shown) multiple transmitters, multiple receivers, and multiple transceivers. In one embodiment, the antenna 650 is replaced with a multi-antenna array 650 that can form a plurality of beams each of which points in a distinct direction. The transmitter 612 can be configured to wirelessly transmit signals having different types or functions, such signals being generated by the processor 602. Similarly, the receiver 614 is configured to receive wireless signals having different types or functions, and the processor 602 is configured to process signals of a plurality of different types.

The Bot 600 in this example may serve as Bot 111 in FIG. 1 for sound sensing in a venue. For example, the wireless signal generator 622 may generate and transmit, via the transmitter 612, a wireless signal through a wireless channel in the venue. The wireless signal carries information of the channel. Because the wireless signal is reflected by a sounding or vibrating object in the venue, the channel information includes sound information from the object. As such, a speech or other expression can be detected or reconstructed based on the wireless signal. The generation of the wireless signal at the wireless signal generator 622 may be based on a request for sound sensing from another device, e.g. an Origin, or based on a system pre-configuration. That is, the Bot 600 may or may not know that the wireless signal transmitted will be used for wireless sound sensing.

The synchronization controller 606 in this example may be configured to control the operations of the Bot 600 to be synchronized or un-synchronized with another device, e.g. an Origin or another Bot. In one embodiment, the synchronization controller 606 may control the Bot 600 to be synchronized with an Origin that receives the wireless signal transmitted by the Bot 600. In another embodiment, the synchronization controller 606 may control the Bot 600 to transmit the wireless signal asynchronously with other Bots. In another embodiment, each of the Bot 600 and other Bots may transmit the wireless signals individually and asynchronously.

The carrier configurator 620 is an optional component in Bot 600 to configure transmission resources, e.g. time and carrier, for transmitting the wireless signal generated by the wireless signal generator 622. In one embodiment, each CI of the time series of CI has one or more components each corresponding to a carrier or sub-carrier of the transmission of the wireless signal. The wireless sound sensing may be based on any one or any combination of the components.

The power module 608 can include a power source such as one or more batteries, and a power regulator, to provide regulated power to each of the above-described modules in FIG. 6. In some embodiments, if the Bot 600 is coupled to a dedicated external power source (e.g., a wall electrical outlet), the power module 608 can include a transformer and a power regulator.

The various modules discussed above are coupled together by a bus system 630. The bus system 630 can include a data bus and, for example, a power bus, a control signal bus, and/or a status signal bus in addition to the data bus. It is understood that the modules of the Bot 600 can be operatively coupled to one another using any suitable techniques and mediums.

Although a number of separate modules or components are illustrated in FIG. 6, persons of ordinary skill in the art will understand that one or more of the modules can be combined or commonly implemented. For example, the processor 602 can implement not only the functionality described above with respect to the processor 602, but also implement the functionality described above with respect to the wireless signal generator 622. Conversely, each of the modules illustrated in FIG. 6 can be implemented using a plurality of separate components or elements.

Figure 7:
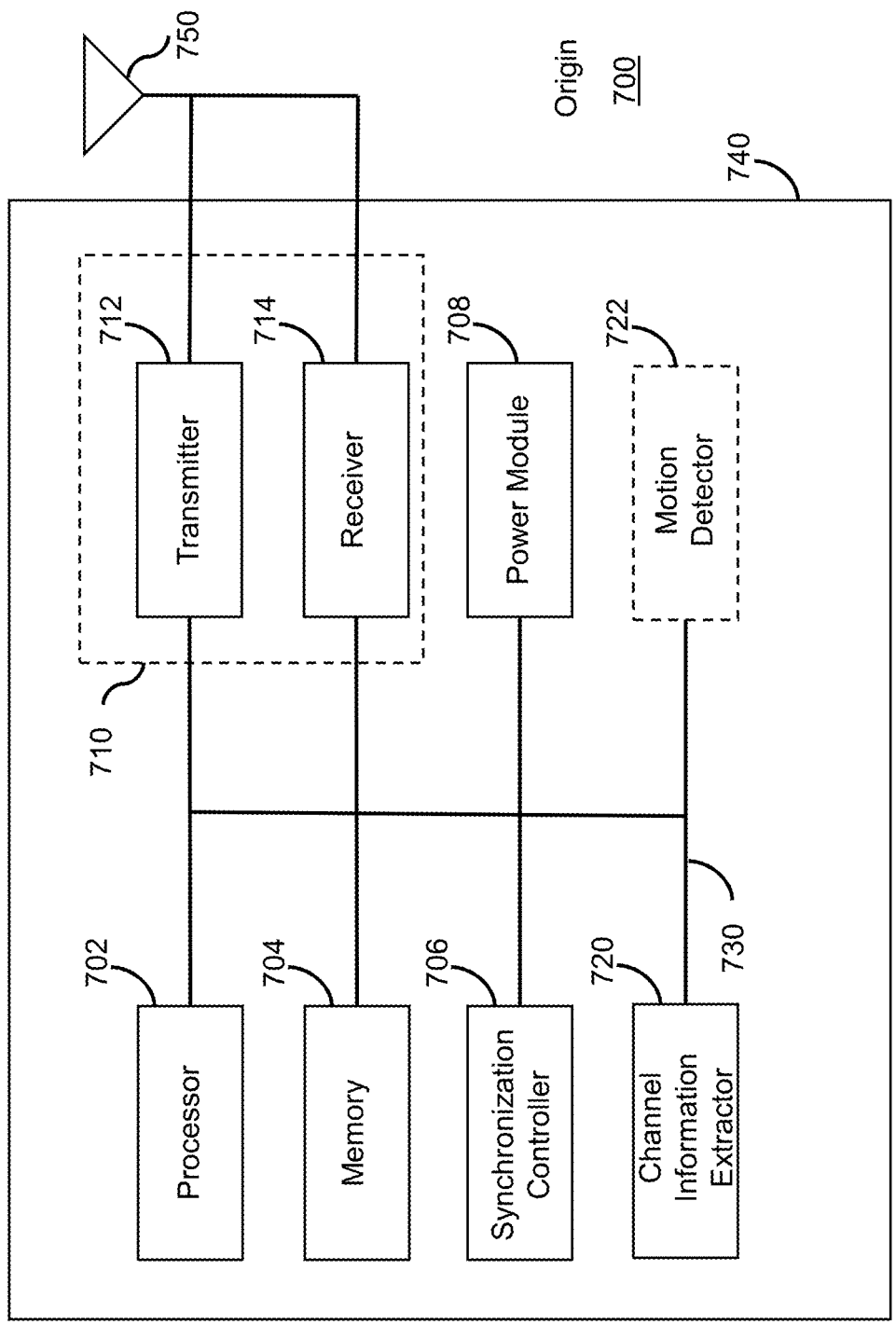
FIG. 7 illustrates an exemplary block diagram of a second wireless device of a sound sensing system, according to some embodiments of the present disclosure.

FIG. 7 illustrates an exemplary block diagram of a second wireless device, e.g. an Origin 700, of a sound sensing system, according to one embodiment of the present teaching. The Origin 700 is an example of a device that can be configured to implement the various methods described herein. The Origin 700 in this example may serve as Origin 112 in FIG. 1 for wirelessly sound sensing in a venue. As shown in FIG. 7, the Origin 700 includes a housing 740 containing a processor 702, a memory 704, a transceiver 710 comprising a transmitter 712 and a receiver 714, a power module 708, a synchronization controller 706, a channel information extractor 720, and an optional motion detector 722.

In this embodiment, the processor 702, the memory 704, the transceiver 710 and the power module 708 work similarly to the processor 602, the memory 604, the transceiver 610 and the power module 608 in the Bot 600. An antenna 750 or a multi-antenna array 750 is typically attached to the housing 740 and electrically coupled to the transceiver 710.

The Origin 700 may be a second wireless device that has a different type from that of the first wireless device (e.g. the Bot 600). In particular, the channel information extractor 720 in the Origin 700 is configured for receiving the wireless signal through the wireless channel, and obtaining a time series of channel information (CI) of the wireless channel based on the wireless signal. The channel information extractor 720 may send the extracted CI to the optional motion detector 722 or to a motion detector outside the Origin 700 for wireless sound sensing in the venue.

The motion detector 722 is an optional component in the Origin 700. In one embodiment, it is within the Origin 700 as shown in FIG. 7. In another embodiment, it is outside the Origin 700 and in another device, which may be a Bot, another Origin, a cloud server, a fog server, a local server, and an edge server. The optional motion detector 722 may be configured for detecting sound information from a vibrating object or source in the venue based on motion information. The motion information is computed based on the time series of CI by the motion detector 722 or another motion detector outside the Origin 700.

The synchronization controller 706 in this example may be configured to control the operations of the Origin 700 to be synchronized or un-synchronized with another device, e.g. a Bot, another Origin, or an independent motion detector. In one embodiment, the synchronization controller 706 may control the Origin 700 to be synchronized with a Bot that transmits a wireless signal. In another embodiment, the synchronization controller 706 may control the Origin 700 to receive the wireless signal asynchronously with other Origins. In another embodiment, each of the Origin 700 and other Origins may receive the wireless signals individually and asynchronously. In one embodiment, the optional motion detector 722 or a motion detector outside the Origin 700 is configured for asynchronously computing respective heterogeneous motion information based on the respective time series of CI.

The various modules discussed above are coupled together by a bus system 730. The bus system 730 can include a data bus and, for example, a power bus, a control signal bus, and/or a status signal bus in addition to the data bus. It is understood that the modules of the Origin 700 can be operatively coupled to one another using any suitable techniques and mediums.

Although a number of separate modules or components are illustrated in FIG. 7, persons of ordinary skill in the art will understand that one or more of the modules can be combined or commonly implemented. For example, the processor 702 can implement not only the functionality described above with respect to the processor 702, but also implement the functionality described above with respect to the channel information extractor 720. Conversely, each of the modules illustrated in FIG. 7 can be implemented using a plurality of separate components or elements.

Figure 8:
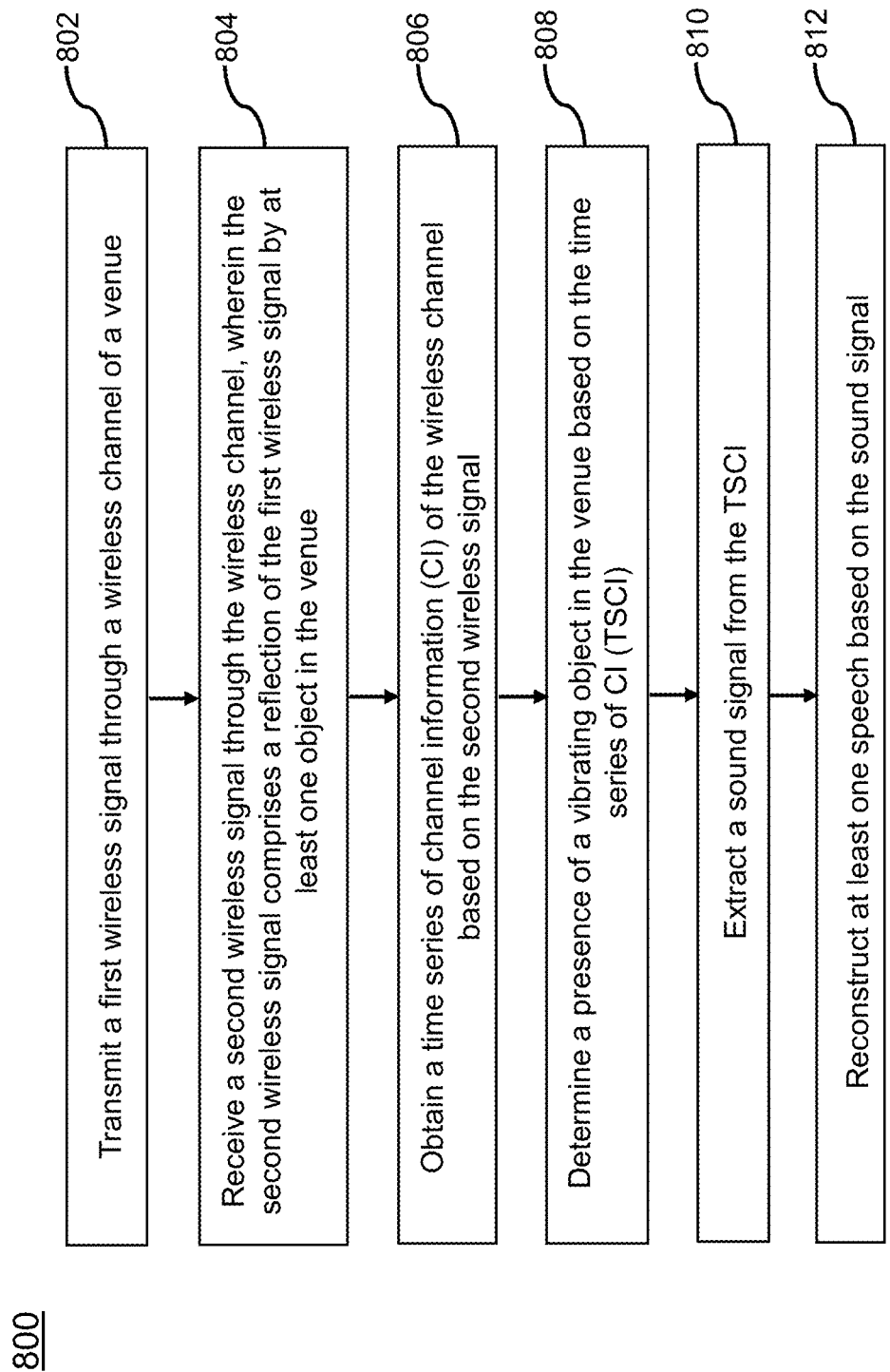
FIG. 8 illustrates a flow chart of an exemplary method for sound sensing using mmWave radio signal, according to some embodiments of the present disclosure.

FIG. 8 illustrates a flow chart of an exemplary method 800 for sound sensing based on mmWave signal, according to some embodiments of the present disclosure. In various embodiments, the method 800 can be performed by the systems disclosed above. At operation 802, a first wireless signal, e.g. a mmWave signal, is transmitted through a wireless channel of a venue. At operation 804, a second wireless signal is received through the wireless channel, wherein the second wireless signal comprises a reflection of the first wireless signal by at least one object in the venue. At operation 806, a time series of channel information (CI)

of the wireless channel is obtained based on the second wireless signal. At operation 808, a presence of a vibrating object in the venue is determined based on the time series of CI (TSCI). At operation 810, a sound signal is extracted from the TSCI. At operation 812, at least one speech is reconstructed based on the sound signal, e.g. using a deep learning model. The order of the operations in FIG. 8 may be changed according to various embodiments of the present teaching.

In some embodiments, a method of a sound sensing system includes steps s1 to s8 as described below.

At step s1: the system captures reflected signals from sound objects and/or sources by an mmWave radio device, using multiple transmit (Tx) and multiple receive (Rx) antennas, using frequency modulated carrier wave (FMCW) waveforms. The signal from a particular distance is defined as g(t, τ), with t denoting long-time, and τ denoting short time:

$$g(t,\tau)=\alpha_l(t)\exp(-j2\pi f_c \tau_l(t)),$$

At step s2: the system converts the FMCW waveforms into channel impulse response (CIR) by applying Fast Fourier Transform (FFT) on the short-time index T for all different T within a period of time.

At step s3: the system apply Short-time Fourier-Transform on channel impulse response to construct Range-Doppler-Time radar datacubes, denoted by G(f, r, k), where f, r, k represent Doppler shift, range, and long time-index, respectively.

At step s4: the system detects and localizes vibrating objects. This may include sub-steps s4a to s4d.

In some embodiments, at sub-step s4a, the system separates radar datacubes into positive and negative parts, i.e. $G^+(f, r, k)=|G(f, r, k)|$ for $f\in(0, N_s/2)$, and $G^-(f, r, k)$ similarly, but with the negative Doppler frequencies.

In some embodiments, at sub-step s4b, the system calculates sound metric for each time-index (k), and range index (r), which is a measure of similarity between $G^+$ and $G^-$. In one example, the sound metric is determined by calculating a cosine distance between $G^+$ and $G^-$. In another example, the sound metric is determined by calculating other distance metrics between the two, such as L0, L1, L2, L_inf. In another example, the sound metric is determined by calculating a modified cosine distance, as follows:

$$m(r,k) = \frac{\sum_f |\hat{G}^+(f,r,k)\hat{G}^-(f,r,k)|^2}{\max\left(\sum_f |\hat{G}^+(f,r,k)|^2, \sum_f |\hat{G}^-(f,r,k)|^2\right)},$$

where the summation is limited w.r.t. certain frequencies for more robust detection.

In some embodiments, at sub-step s4c, the system subtracts background from sound metric to make the system more robust against static background reflections. In one example, assuming a stationary background, the system can calculate time average of m(r, k), for each distance, and subtract the values from the actual value. Time average can be calculated by taking any first order statistics, such as mean, median or trimmed mean.

In some embodiments, at sub-step s4d, the system detects and localizes objects based on the sound metric. In one example, the system detects the object by thresholding sound metric values, using a predefined threshold T*. In another example, the system extracts outliers in the sound metric m(r,k) to detect the object, by using an outlier detection method. Outlier detection can be done by frame variance, or absolute deviation from mean, or any other method.

In some embodiments, other object detection metrics can be used at step s4, such as CFAR detection, or peak detection to detect the presence of vibration and find the location of it.

In some embodiments, at step s5, the system extracts a real-valued vibration signal from the complex valued radar baseband signal. This may include sub-steps s5a to s5e.

In some embodiments, at sub-step s5a, the system filters out background motion and low-speed motion by a low-pass filter on CIR. In other embodiments, at sub-step s5a, the system can zero out frequencies near 0 Hz on spectrogram.

In some embodiments, at sub-step s5b, the system projects the complex signal (with Real/Imag) part onto a line in complex domain, and therefore represents complex values with a scalar. In other embodiments, at sub-step s5b, instead of projection onto an axis, the system can extract the Real or Imaginary part of the signal, which is also another projection.

In some embodiments, at sub-step s5c, the system can recalculate the spectrogram of the signal after projection.

In some embodiments, at sub-step s5d, the system can extract maximum of $G^+$, and $G^-$ to improve the quality of the sound reconstructed.

In some embodiments, at sub-step s5e, the system can apply an inverse-short time Fourier Transform to extract the real-valued sound signal At step s6, the system may apply signal enhancement using multiple diversities. This may include sub-steps s6a and s6b.

In some embodiments, at sub-step s6a, the system can apply antenna selection to extract the best antenna from each distance. In other embodiments, at sub-step s6a, the system can apply beamforming to reduce noise.

In some embodiments, at sub-step s6b, the system can apply multipath selection to extract the best signal. For example, the system can calculate signal-to-noise ratio when the venue is empty without any object, and select the best antenna/multipath when there is reflected signal.

At step s7, the system can train a deep learning module for signal enhancement that applies denoising and bandwidth expansion at the same time to the output of the previous steps. In the output of the previous stage, high frequency components of the reconstructed speech are lost due to the nature of object vibration, and background clutter creates additional noise. In order to reconstruct high-quality, intelligible speech, the alterations due to object surface and object vibration properties needs to be reversed, which includes denoising, and reconstruction of high frequency components. Deep learning module requires training data, which could be achieved by different methods.

In some embodiments, to obtain the training data, the system can capture frequency response of different types of objects in the environment, and background noise for multiple rooms and environments. In addition, the system can obtain simulated synthetic data by using online datasets. Assuming a frequency response of $h_i$ captured from the surface of object i, and noise signals $n_j$ for realization j, synthetic/noisy mixture of input signal x is denoted by $\hat{x}$ and is given as $\hat{x}=h_i \star x + n_j$ for different i's and j's.

In other embodiments, to obtain the training data, the system can perform extensive data collection of radio and audio signals simultaneously in the venue. As such, the system can be used to train a deep learning module for signal enhancement for denoising and bandwidth expansion.

Degraded speech may be used as an input to a neural network, and high-quality speech is used as the target for the estimation by the neural network.

At step s8, the system may use the deep learning module with the output radio signals to enhance noisy, and bandwidth limited radio sound, so as to reconstruct a speech based on the sound signal.

The following numbered clauses provide implementation examples for sound sensing based on radio signals.

Clause 1. A system for sound sensing, comprising: a transmitter configured to transmit a first wireless signal through a wireless channel of a venue; a receiver configured to receive a second wireless signal through the wireless channel, wherein the second wireless signal comprises a reflection of the first wireless signal by at least one object in the venue; and a processor configured for: obtaining a time series of channel information (CI) of the wireless channel based on the second wireless signal, determining a presence of a vibrating object in the venue based on the time series of CI (TSCI), extracting a sound signal from the TSCI, and reconstructing at least one speech based on the sound signal.

Clause 2. The system of clause 1, wherein: each CI comprises a CIR; and the first wireless signal is carried on a millimeter wave.

Clause 3. The system of clause 2, wherein the vibrating object is at least one of: a person actively giving the at least one speech; a device actively outputting the at least one speech; or an object passively vibrating according to the at least one speech.

Clause 4. The system of clause 3, wherein obtaining the TSCI comprises: applying a fast Fourier transform on frequency modulated carrier wave (FMCW) waveforms carried by the second wireless signal with respect to a short-time index.

Clause 5. The system of clause 4, wherein obtaining the TSCI comprises: applying a short-time Fourier transform on the TSCI to construct a radar spectrogram, wherein the radar spectrogram is a function having: a frequency index representing Doppler frequency shift, a long-time index representing time frames, and a distance range index representing distance ranges from the receiver.

Clause 6. The system of clause 5, wherein determining the presence of the vibrating object comprises: determining a first magnitude of the radar spectrogram for positive frequencies; determining a second magnitude of the radar spectrogram for negative frequencies; and calculating a sound metric based on a similarity between the first magnitude and the second magnitude, with respect to each time frame and each distance range from the receiver.

Clause 7. The system of clause 6, wherein calculating the sound metric comprises: calculating a distance function between the first magnitude and the second magnitude, with respect to each time frame and each distance range from the receiver, wherein the distance function comprises at least one of: a cosine distance, L0 distance, L1 distance, L2 distance, or L_inf distance.

Clause 8. The system of clause 6, wherein determining the presence of the vibrating object comprises: calculating a time average of the sound metric for each distance range from the receiver; and subtracting the time average from the sound metric to generate sound metric values at each time frame and each distance range from the receiver.

Clause 9. The system of clause 8, wherein determining the presence of the vibrating object comprises: determining the presence of the vibrating object by applying a predetermined threshold on the sound metric values; and localizing the vibrating object.

Clause 10. The system of clause 8, wherein determining the presence of the vibrating object comprises: determining the presence of the vibrating object by detecting outliers in the sound metric values based on time frame variance or absolute deviation from mean; and localizing the vibrating object.

Clause 11. The system of clause 8, wherein determining the presence of the vibrating object comprises: determining the presence of the vibrating object by extracting peaks of the radar spectrogram along the long-time index and/or the distance range index; and localizing the vibrating object.

Clause 12. The system of clause 8, wherein determining the presence of the vibrating object comprises: determining the presence of the vibrating object by applying a constant false alarm rate (CFAR) detection rule on the radar spectrogram; and localizing the vibrating object.

Clause 13. The system of clause 8, wherein extracting the sound signal from the TSCI comprises: filtering out background motion and low-speed motion to generate a filtered signal, wherein the filtering comprises at least one of: applying a low-pass filter on the TSCI; or removing frequency components in a proximity of zero frequency on the radar spectrogram.

Clause 14. The system of clause 13, wherein extracting the sound signal from the TSCI comprises: generating a projected signal based on the filtered signal, wherein the projected signal is generated by at least one of: projecting the filtered signal onto a line in complex domain to represent complex values of the filtered signal with scalars; or extracting a real part or an imaginary part of the filtered signal.

Clause 15. The system of clause 14, wherein extracting the sound signal from the TSCI comprises: recalculating the radio spectrogram based on the projected signal.

Clause 16. The system of clause 15, wherein extracting the sound signal from the TSCI comprises: extracting a positive magnitude spectrogram of the recalculated radar spectrogram for positive frequencies; extracting a negative magnitude spectrogram of the recalculated radar spectrogram for negative frequencies; and determining a sound spectrogram based on a maximum of the positive magnitude spectrogram and the negative magnitude spectrogram.

Clause 17. The system of clause 16, wherein extracting the sound signal from the TSCI comprises: applying an inverse short-time Fourier transform on the sound spectrogram to extract a real-valued sound signal.

Clause 18. The system of clause 17, wherein extracting the sound signal from the TSCI comprises: generating an enhanced sound signal from the real-valued sound signal based on receiver diversity, wherein the second wireless signal is received by multiple antennas on the receiver, the receiver diversity is obtained by selecting a best antenna on the receiver for each distance range from the receiver, and the best antenna is predetermined based on calculating signal-to-noise ratio (SNR) for each antenna when there is no sound in the venue.

Clause 19. The system of clause 17, wherein extracting the sound signal from the TSCI comprises: generating an enhanced sound signal from the real-valued sound signal based on beamforming.

Clause 20. The system of clause 17, wherein extracting the sound signal from the TSCI comprises: generating an enhanced sound signal from the real-valued sound signal based on multipath diversity, wherein the wireless channel includes a plurality of multipath components, the multipath diversity is obtained by selecting a best multipath component of the wireless channel for each distance range from the receiver, and the best multipath component is predetermined based on calculating signal-to-noise ratio (SNR) for each multipath component when there is no sound in the venue.

Clause 21. The system of clause 20, wherein reconstructing the at least one speech based on the sound signal comprises: applying a deep learning model on an input spectrogram to extract a magnitude spectrogram, wherein the input spectrogram is generated based on the enhanced sound signal; and reconstructing time domain waveforms of the at least one speech based on the magnitude spectrogram and phase information of the input spectrogram.

Clause 22. The system of clause 21, wherein the deep learning model is pre-trained to enhance input signals by de-noising and bandwidth expansion at the same time.

Clause 23. The system of clause 22, wherein the processor is further configured for: training the deep learning model based on a training data set, wherein the training data set includes: frequency responses of different types of objects in the venue, background noise in the venue, and synthetic audio signals simulated based on open-source data.

Clause 24. The system of clause 22, wherein the processor is further configured for: training the deep learning model based on a training data set, wherein the training data set includes: radio signals and audio signals collected at the same time in the venue, and background noise in the venue.

Clause 25. The system of clause 22, wherein: the sound signal includes sound information from multiple sources at different locations in the venue; and the processor is further configured for separating, based on the radar spectrogram, an individual spectrogram of sound information from each of the multiple sources, and reconstructing a speech based on each individual spectrogram.

Clause 26. The system of clause 25, wherein the processor is further configured for obtaining physical characteristics of each individual spectrogram; and classifying, based on the physical characteristics of each individual spectrogram, each respective one of the multiple sources as a human or an inanimate source.

Clause 27. A wireless device of a sound sensing system, comprising: a processor; a memory communicatively coupled to the processor; and a receiver communicatively coupled to the processor, wherein: an additional wireless device of the sound sensing system is configured to transmit a first wireless signal through a wireless channel of a venue, the receiver is configured to receive a second wireless signal through the wireless channel, the second wireless signal comprises a reflection of the first wireless signal by at least one object in the venue, and the processor is configured for: obtaining a time series of channel information (CI) of the wireless channel based on the second wireless signal, determining a presence of a vibrating object in the venue based on the time series of CI (TSCI), extracting a sound signal from the TSCI, and reconstructing at least one speech based on the sound signal.

Clause 28. The wireless device of clause 27, wherein obtaining the TSCI comprises: applying a fast Fourier transform on frequency modulated carrier wave (FMCW) waveforms carried by the second wireless signal with respect to a short-time index; and applying a short-time Fourier transform on the TSCI to construct a radar spectrogram, wherein the radar spectrogram is a function having: a frequency index representing Doppler frequency shift, a long-time index representing time frames, and a distance range index representing distance ranges from the receiver.

Clause 29. The wireless device of clause 28, wherein determining the presence of the vibrating object comprises: determining a first magnitude of the radar spectrogram for positive frequencies; determining a second magnitude of the radar spectrogram for negative frequencies; calculating a sound metric based on a similarity between the first magnitude and the second magnitude, with respect to each time frame and each distance range from the receiver.

Clause calculating a time average of the sound metric for each distance range from the receiver; and subtracting the time average from the sound metric to generate sound metric values at each time frame and each distance range from the receiver.

Clause 30. A method of a sound sensing system, comprising: transmitting a first wireless signal through a wireless channel of a venue; receiving a second wireless signal through the wireless channel, wherein the second wireless signal comprises a reflection of the first wireless signal by at least one object in the venue; obtaining a time series of channel information (CI) of the wireless channel based on the second wireless signal; determining a presence of a vibrating object in the venue based on the time series of CI (TSCI); extracting a sound signal from the TSCI; and reconstructing at least one speech based on the sound signal.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for sound sensing, comprising:
   a transmitter configured to transmit a first wireless signal through a wireless channel of a venue;
   a receiver configured to receive a second wireless signal through the wireless channel, wherein the second wireless signal comprises a reflection of the first wireless signal by at least one object in the venue; and
   a processor configured for:
      obtaining a time series of channel information (CI) of the wireless channel based on the second wireless signal,
      constructing a radar spectrogram as a function of frequency,
      determining a first magnitude of the radar spectrogram for positive frequencies,
      determining a second magnitude of the radar spectrogram for negative frequencies,
      calculating a sound metric based on a similarity between the first magnitude and the second magnitude,
      calculating a time average of the sound metric,
      subtracting the time average from the sound metric to generate sound metric values,
      determining a presence of a vibrating object in the venue based on the time series of CI (TSCI) and the sound metric values,
      extracting a sound signal from the TSCI, and
      reconstructing at least one speech based on the sound signal.

2. The system of claim 1, wherein:
   each CI comprises a CIR; and
   the first wireless signal is carried on a millimeter wave.

3. The system of claim 2, wherein the vibrating object is at least one of:
   a person actively giving the at least one speech;
   a device actively outputting the at least one speech; or
   an object passively vibrating according to the at least one speech.

4. The system of claim 3, wherein obtaining the TSCI comprises:
   applying a fast Fourier transform on frequency modulated carrier wave (FMCW) waveforms carried by the second wireless signal with respect to a short-time index.

5. The system of claim 4, wherein the radar spectrogram is constructed based on:
   applying a short-time Fourier transform on the TSCI, wherein the radar spectrogram is a function having: a frequency index representing Doppler frequency shift, a long-time index representing time frames, and a distance range index representing distance ranges from the receiver.

6. The system of claim 5, wherein
   the sound metric is calculated with respect to each time frame and each distance range from the receiver.

7. The system of claim 6, wherein calculating the sound metric comprises:
   calculating a distance function between the first magnitude and the second magnitude, with respect to each time frame and each distance range from the receiver,
   wherein the distance function comprises at least one of: a cosine distance, L0 distance, L1 distance, L2 distance, or L_inf distance.

8. The system of claim 6, wherein:
   the time average of the sound metric is calculated for each distance range from the receiver; and
   the sound metric values are generated at each time frame and each distance range from the receiver.

9. The system of claim 8, wherein determining the presence of the vibrating object comprises:
   determining the presence of the vibrating object by applying a predetermined threshold on the sound metric values; and
   localizing the vibrating object.

10. The system of claim 8, wherein determining the presence of the vibrating object comprises:
    determining the presence of the vibrating object by detecting outliers in the sound metric values based on time frame variance or absolute deviation from mean; and
    localizing the vibrating object.

11. The system of claim 8, wherein determining the presence of the vibrating object comprises:
    determining the presence of the vibrating object by extracting peaks of the radar spectrogram along the long-time index and/or the distance range index; and
    localizing the vibrating object.

12. The system of claim 8, wherein determining the presence of the vibrating object comprises:
    determining the presence of the vibrating object by applying a constant false alarm rate (CFAR) detection rule on the radar spectrogram; and
    localizing the vibrating object.

13. The system of claim 8, wherein extracting the sound signal from the TSCI comprises:
    filtering out background motion and low-speed motion to generate a filtered signal, wherein the filtering comprises at least one of:
       applying a low-pass filter on the TSCI; or
       removing frequency components in a proximity of zero frequency on the radar spectrogram.

14. The system of claim 13, wherein extracting the sound signal from the TSCI comprises:
    generating a projected signal based on the filtered signal, wherein the projected signal is generated by at least one of:
       projecting the filtered signal onto a line in complex domain to represent complex values of the filtered signal with scalars; or extracting a real part or an imaginary part of the filtered signal.

15. The system of claim 14, wherein extracting the sound signal from the TSCI comprises:
recalculating the radio spectrogram based on the projected signal.

16. The system of claim 15, wherein extracting the sound signal from the TSCI comprises:
extracting a positive magnitude spectrogram of the recalculated radar spectrogram for positive frequencies;
extracting a negative magnitude spectrogram of the recalculated radar spectrogram for negative frequencies; and
determining a sound spectrogram based on a maximum of the positive magnitude spectrogram and the negative magnitude spectrogram.

17. The system of claim 16, wherein extracting the sound signal from the TSCI comprises:
applying an inverse short-time Fourier transform on the sound spectrogram to extract a real-valued sound signal.

18. The system of claim 17, wherein extracting the sound signal from the TSCI comprises:
generating an enhanced sound signal from the real-valued sound signal based on receiver diversity, wherein
the second wireless signal is received by multiple antennas on the receiver,
the receiver diversity is obtained by selecting a best antenna on the receiver for each distance range from the receiver, and
the best antenna is predetermined based on calculating signal-to-noise ratio (SNR) for each antenna when there is no sound in the venue.

19. The system of claim 17, wherein extracting the sound signal from the TSCI comprises:
generating an enhanced sound signal from the real-valued sound signal based on beamforming.

20. The system of claim 17, wherein extracting the sound signal from the TSCI comprises:
generating an enhanced sound signal from the real-valued sound signal based on multipath diversity, wherein
the wireless channel includes a plurality of multipath components,
the multipath diversity is obtained by selecting a best multipath component of the wireless channel for each distance range from the receiver, and
the best multipath component is predetermined based on calculating signal-to-noise ratio (SNR) for each multipath component when there is no sound in the venue.

21. The system of claim 20, wherein reconstructing the at least one speech based on the sound signal comprises:
applying a deep learning model on an input spectrogram to extract a magnitude spectrogram, wherein the input spectrogram is generated based on the enhanced sound signal; and
reconstructing time domain waveforms of the at least one speech based on the magnitude spectrogram and phase information of the input spectrogram.

22. The system of claim 21, wherein the deep learning model is pre-trained to enhance input signals by de-noising and bandwidth expansion at the same time.

23. The system of claim 22, wherein the processor is further configured for:
training the deep learning model based on a training data set, wherein the training data set includes:
frequency responses of different types of objects in the venue,
background noise in the venue, and
synthetic audio signals simulated based on open-source data.

24. The system of claim 22, wherein the processor is further configured for:
training the deep learning model based on a training data set, wherein the training data set includes:
radio signals and audio signals collected at the same time in the venue, and
background noise in the venue.

25. The system of claim 22, wherein:
the sound signal includes sound information from multiple sources at different locations in the venue; and
the processor is further configured for
separating, based on the radar spectrogram, an individual spectrogram of sound information from each of the multiple sources, and
reconstructing a speech based on each individual spectrogram.

26. The system of claim 25, wherein the processor is further configured for
obtaining physical characteristics of each individual spectrogram; and
classifying, based on the physical characteristics of each individual spectrogram, each respective one of the multiple sources as a human or an inanimate source.

27. A wireless device of a sound sensing system, comprising:
a processor;
a memory communicatively coupled to the processor; and
a receiver communicatively coupled to the processor, wherein:
an additional wireless device of the sound sensing system is configured to transmit a first wireless signal through a wireless channel of a venue,
the receiver is configured to receive a second wireless signal through the wireless channel,
the second wireless signal comprises a reflection of the first wireless signal by at least one object in the venue, and
the processor is configured for:
obtaining a time series of channel information (CI) of the wireless channel based on the second wireless signal,
constructing a radar spectrogram as a function of frequency,
determining a first magnitude of the radar spectrogram for positive frequencies,
determining a second magnitude of the radar spectrogram for negative frequencies,
calculating a sound metric based on a similarity between the first magnitude and the second magnitude,
calculating a time average of the sound metric,
subtracting the time average from the sound metric to generate sound metric values,
determining a presence of a vibrating object in the venue based on the time series of CI (TSCI) and the sound metric values,
extracting a sound signal from the TSCI, and
reconstructing at least one speech based on the sound signal.

28. The wireless device of claim 27, wherein obtaining the TSCI comprises:

applying a fast Fourier transform on frequency modulated carrier wave (FMCW) waveforms carried by the second wireless signal with respect to a short-time index; and applying a short-time Fourier transform on the TSCI to construct the radar spectrogram, wherein the radar spectrogram is a function having: a frequency index representing Doppler frequency shift, a long-time index representing time frames, and a distance range index representing distance ranges from the receiver.

29. The wireless device of claim 28, wherein:

the sound metric is calculated with respect to each time frame and each distance range from the receiver;

the time average of the sound metric is calculated for each distance range from the receiver; and the sound metric values are generated at each time frame and each distance range from the receiver.

30. A method of a sound sensing system, comprising:

transmitting a first wireless signal through a wireless channel of a venue;

receiving a second wireless signal through the wireless channel, wherein the second wireless signal comprises a reflection of the first wireless signal by at least one object in the venue;

obtaining a time series of channel information (CI) of the wireless channel based on the second wireless signal;

constructing a radar spectrogram as a function of frequency;

determining a first magnitude of the radar spectrogram for positive frequencies;

determining a second magnitude of the radar spectrogram for negative frequencies;

calculating a sound metric based on a similarity between the first magnitude and the second magnitude;

calculating a time average of the sound metric;

subtracting the time average from the sound metric to generate sound metric values;

determining a presence of a vibrating object in the venue based on the time series of CI (TSCI) and the sound metric values;

extracting a sound signal from the TSCI; and reconstructing at least one speech based on the sound signal.

* * * * *